(12) United States Patent
Gray

(10) Patent No.: US 7,714,846 B1
(45) Date of Patent: May 11, 2010

(54) DIGITAL SIGNAL PROCESSED TOUCHSCREEN SYSTEM

(75) Inventor: Patrick T. Gray, Cedar Park, TX (US)

(73) Assignee: Wacom Co., Ltd., Kita Saitama-Gun, Saitama (JP)

( * ) Notice: Subject to any disclaimer, the term of this patent is extended or adjusted under 35 U.S.C. 154(b) by 1261 days.

(21) Appl. No.: 11/211,272

(22) Filed: Aug. 25, 2005

Related U.S. Application Data

(60) Provisional application No. 60/604,655, filed on Aug. 26, 2004.

(51) Int. Cl.
    *G06F 3/041* (2006.01)
(52) U.S. Cl. .................................... 345/173; 178/18.05
(58) Field of Classification Search ......... 345/173–179; 178/18.06; 340/706, 712, 146.03
    See application file for complete search history.

(56) References Cited

U.S. PATENT DOCUMENTS

| | | | |
|---|---|---|---|
| 4,071,691 A | 1/1978 | Pepper, Jr. | |
| 4,293,734 A * | 10/1981 | Pepper, Jr. | 178/18.01 |
| 4,371,746 A | 2/1983 | Pepper, Jr. | |
| 4,600,807 A | 7/1986 | Kable | |
| 4,698,460 A | 10/1987 | Krein et al. | |
| 4,698,461 A | 10/1987 | Meadows et al. | |
| 4,707,845 A | 11/1987 | Krein et al. | |
| 6,670,949 B1 * | 12/2003 | Ahn et al. | 345/173 |
| 6,977,646 B1 * | 12/2005 | Hauck et al. | 345/173 |
| 7,077,927 B2 * | 7/2006 | Bottari et al. | 156/233 |
| 7,362,313 B2 * | 4/2008 | Geaghan et al. | 345/173 |
| 2004/0183787 A1 * | 9/2004 | Geaghan et al. | 345/173 |

* cited by examiner

*Primary Examiner*—Chanh Nguyen
*Assistant Examiner*—Tsegaye Seyoum
(74) *Attorney, Agent, or Firm*—Garlick Harrison & Markison; Shayne X. Short; James A. Harrison

(57) ABSTRACT

Digital signal processed touchscreen system. The invention employs amplitude ramped signals across a touchscreen. The pattern to which the amplitude ramped electric signals are provided may be located on the surface of the touchscreen, or alternatively on the backside of the touchscreen. The signal processing employed by the invention, using digital signal processing techniques, is operable to discern a user's touch and to determine its location. A dielectric, protective surface is used to enable implementation into a wide variety of applications, including those applications that are environmentally rugged and have, until now, been too rugged for prior art touchscreen systems. The invention employs a user generated unbalanced capacitive load generated on the touchscreen to identify the location of the user's touch.

12 Claims, 17 Drawing Sheets

(shown at Time 1)

DIGITAL SIGNAL PROCESSED TOUCHSCREEN SYSTEM

CROSS REFERENCE TO RELATED PATENTS/PATENT APPLICATIONS

Provisional Priority Claim

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/604,655, entitled "DIGITAL SIGNAL PROCESSED TOUCHSCREEN SYSTEM," filed Thursday, Aug. 26, 2004 (Aug. 26, 2004), pending.

BACKGROUND OF THE INVENTION

1. Technical Field of the Invention

The invention relates generally to man to machine interfaces (MMIs) implemented using touchscreens; and, more particularly, it relates to a capacitively coupled system.

2. Description of Related Art

The use of MMI systems has been ongoing for some time now. A variety of everyday activities employ some form of MMI. For example, banking may now be performed without the assistance of bank personnel by using an automatic teller machine (ATM); a driver may purchase gasoline without interacting with a sales agent using the interfaces commonly located at the gas pumps. However, these two examples illustrate how the development of rugged MMIs has often taken the route of employing rugged, plastic-type keys located near a display. This has been the industries solution to try to provide a rugged, durable, MMI that is capable of withstanding a variety of environmental and use-induced stresses. Some MMIs do in fact employ a system where a user may make selections by actually touching and interacting with the display itself (in a true touchscreen system), but such applications are not very widespread, and they are nearly never placed in environments where the may the touchscreen is exposed to a rugged environment. These prior art touchscreen systems often find themselves within very environmentally protected installations.

These prior art touchscreen systems typically employ a pattern on a coating that is placed on the surface of the touchscreen that a user does in fact touch. This approach often includes the use of some type of clear coatings over the surface-laid pattern. These patterns are typically very delicate in nature and the engineering required to ensure proper protection of the pattern can be quite extensive, and sometimes very expensive, in some instances. Clearly, the fact that the pattern is placed on the touchscreen surface and is exposed to the environment significantly limits the applications in which many prior art touchscreens may be used. For example, the environmental considerations of humidity, extreme heat and cold (including large and/or rapid temperature changes), and other environmental considerations limit the implementation of such prior art touchscreen technologies.

Many such prior art technologies employ a continuous pattern on the surface of a touchscreen. Oftentimes, the corners of the touchscreen are simultaneously energized with a common signal, and the entire touchscreen surface is energized. When a user touches the surface material, the user's touch interacts with the signals that are provided by the pattern on the surface of a touchscreen. This prior art approach suffers from the fact that the coating is again resident on the surface of the touchscreen where it is exposed to a variety of potentially harmful effects. The degradation of this coating material will degrade the overall performance of the touchscreen system, if not result in the cessation of functionality entirely.

Another prior art employs a matrix type of pattern on the backside of a touchscreen having rows and columns located on the backside of the touchscreen surface that is commonly made up of some protective material. This may be viewed as being a digitally arranged pattern, having discrete rows and columns that may be used as possible touch locations. The system's ability to discern the location of a user's touch is governed by the pre-arranged layout of the matrix type pattern. Employing a row and column design allows the capitalization of information retrieved from the row and column associated with a user's touch. The row and column pattern (on the backside of the surface of the touchscreen) are energized and the associated fields communicatively couple through the protective surface material. The row and column approach typically includes at least one additional layer that separates the rows and columns of the row and column matrix. This additional layer can complicate the touchscreen system, in that, there is yet another layer of material through which signals' communicatively coupling must occur for proper operation and the ability to detect a user's touch.

However, one of the several deficiencies of this approach is inherent to the row and column implementation in terms of resolution and the system's ability to discern the true location of the user's touch. The processing and manufacturing of the system, based on the proximity of the rows and columns, largely governs the resolution of the touchscreen surface. In addition, there is often a limit to the closeness of the proximity of the rows and columns that may be used while still allowing for the signal processing to extract precisely which row and which column is associated with a user's touch. This density into which the rows and columns may be placed also prohibits its implementation into applications of relatively small real estate. Applications that require a relatively small implementation or are extremely real estate/space conscious may not be candidates for this technology. Particularly when these applications require a relatively large number of selectable options on the touchscreen, this particular technology simply cannot meet these needs. The ability of this row and column implementation may, on one hand, enable application in more rugged environments (given that the rows and columns are located on backside layers of the touchscreen); however, on the other hand, this prior art approach fails to meet the needs of other applications (including those requiring higher resolution of selectable options on the touchscreen and/or real estate/space conscious designs).

Moreover, as the closeness of the rows and columns increases, there is ever more cross coupling between them. This may require additional insulating material between them. This may compete with the communicative coupling of the desired signal through the surface's protective material. In addition, the cross coupling between extremely close rows and columns may be so great that the signal processing, absent more advanced and sometimes very complex methods, may simply be unable to discern the true location of a user's touch and to determine its location.

Other prior art technologies are operable to use a pen-like pointer that is used to select portions of a touchscreen. In such implementations, the pen actually interacts with the touchscreen system, in that, the current that travels from the surface of the touchscreen through the pen-like pointer is measured in the calculations that are performed to determine the user's touch location, when the pen-like pointer touches the touchscreen.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

The invention provides a solution that maintains a high degree of resolution across a touchscreen surface while also offering an extremely robust and rugged package making it amenable to implementation into a variety of applications. One particularly desirable application includes those touchscreen applications that are located outdoors. Whereas many prior art technologies may typically not be implemented outdoors, largely due to the fluctuations of environment including temperature and humidity fluctuations, the invention may be implemented outdoors very easily. The continuous nature of the amplitude ramped field used by the invention also ensures a high degree of resolution compared to the row and column based prior art touchscreen systems that have attempted to bridge the gap and offer outdoor application.

A resistive linearized pattern may be placed on the backside of a protective dielectric surface. The protective dielectric surface may be composed of a tempered glass surface in some instances. However, the protective dielectric surface may also be composed of other types of dielectric materials as well without departing from the scope and spirit of the invention.

An amplitude ramped field is generated by energizing the pattern on the backside of the touchscreen. In one embodiment, the touchscreen includes a substantially rectangular shape, and the corners of the touchscreen are operable as nodes that are communicatively coupled to drive signal circuits. The drive signal circuits, provided to each of the corners of the touchscreen, are comparable in terms of components, yet and they are driven differently at various points in time. By analyzing measurements taken from the corners at various points in time, the particular location of a user's touch may be discerned. In addition, aspects of the invention is also operable within an energy savings mode when no user touch is detected on the touchscreen surface, and the touchscreen system enters into a touch detection mode when it is determined that a user has in fact touched the touchscreen.

It is also noted that the certain aspects of the invention employ signal processing that is operable within systems that choose to include a pattern on the surface of the touchscreen as well. In this case, the amplitude ramped field will be generated by the pattern located on the front side of the touchscreen surface rather than being generated by a pattern on the back side of the touchscreen and communicatively coupled through the touchscreen surface. Therefore, certain aspects of the invention are operable within implementations that desire to use a front side pattern, such as one that is covered with some type of transparent protective coating.

Figure 1:
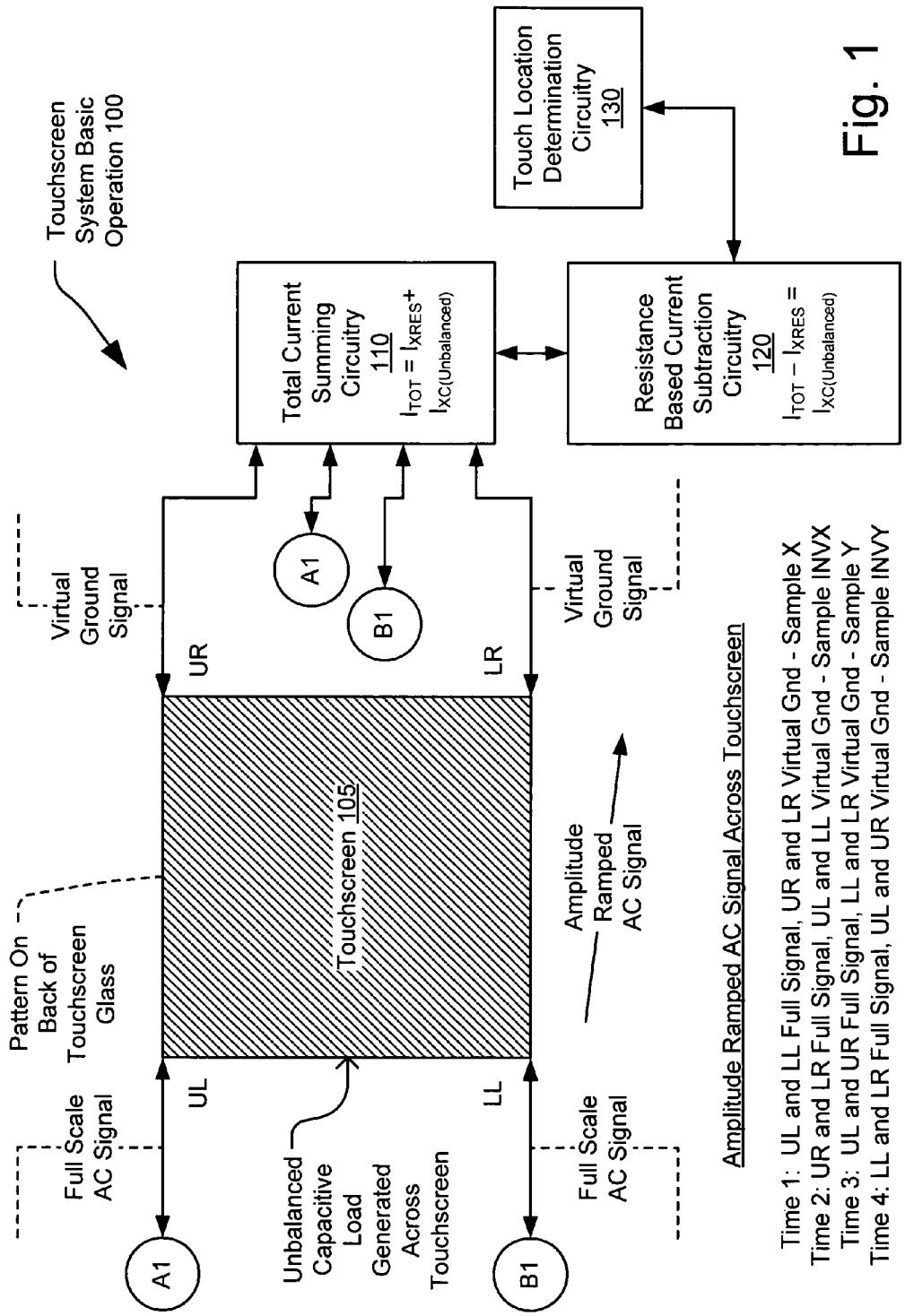
FIG. 1 is a system diagram illustrating an embodiment of basic operation of a touchscreen system that is built in accordance with certain aspects of the invention.

FIG. 1 is a system diagram illustrating an embodiment of basic operation of a touchscreen system 100 that is built in accordance with certain aspects of the invention. A touchscreen 105 includes four corners that are each provided with excitation signals. At one instant, the two left hand corners (upper left UL and lower left LL) are both provided with a full scale AC signal. In addition, at the same instant, the two right hand corners (upper right UR and lower right LR) are both provided with a virtual ground signal. The result is an amplitude ramped field (amplitude ramped AC signal) across the touchscreen 105. Current is injected into each of these four corners of the touchscreen 105. In addition, current is also exiting the touchscreen 105 at each of the corners of the touchscreen 105 as well. When a user touches the touchscreen 105, then the amount of current that does exit the corners of the touchscreen 105 will be altered.

By employing an amplitude ramped AC signal across the surface of the touchscreen 105, when a user touches the touchscreen 105 in a particular location, the interaction of the user and the AC signal then effectuates an unbalanced capacitive load on the touchscreen. As the voltage ramped AC waveform crosses the touchscreen 105, having a maximum voltage amplitude at one side and a minimum voltage amplitude (or zero) at the other side, a user's touch at any point on the touchscreen will return a varying amplitude current flow based on the position of the user's touch.

By knowing the current that is injected into the corners of the touchscreen 105, and also by monitoring the current that exits the corners, the invention is operable to provide inputs from all of the corners into a processing circuitry that is operable to identify the location of the user's touch on the screen. All of the corners' outputs are simultaneously provided to this processing circuitry; the invention need not individually measure the four corners as they are all handled simultaneously using the single circuit. Those having skill in the art will recognize that any number of samples/measurements may be taken within a given cycle to provide for a higher degree of confidence for a particular measurement. Based upon the now changed current that does exit the four corners of the touchscreen 105, the location of the user's touch on the touchscreen 105 may then be accurately discerned.

In addition, as will also be described in other of the various embodiments, the direction of the amplitude ramped field is reversed so that the ramping of the amplitude ramped field goes from right to left; the direction of the ramping of the amplitude ramped field may also be altered to extend from top to bottom and vice versa from bottom to top across the touchscreen 105. During each of these instances, the current that is injected into the four corners will be different, and the measurements of the currents exiting the currents will also be different.

The currents that exit the four corners of the touchscreen 105 are all added simultaneously into the total current summing circuitry 110. When the directions of the amplitude ramped field across the touchscreen 105 are changed, the total current flow exiting all of the four corners may be viewed as being one current measurement. For example, at one instance (time 1), when the UL and LL corners are at full signal and the UR and LR corners are at virtual ground, the total current measurement constitutes a sample X. Then, (time 2) when the direction of the amplitude ramped field is reversed (the UR and LR corners are at full signal and the UL and LL corners are at virtual ground), then the total current measurement constitutes a sample INVX.

Similarly, (time 3) when the direction of the amplitude ramped field extends from the top to the bottom (the UL and UR corners are at full signal and the LL and LR corners are at virtual ground), the total current measurement constitutes a sample Y. Then, (time 4) when the direction of the amplitude ramped field extends from the bottom to the top (the LL and LR corners are at full signal and the UL and UR corners are at virtual ground), the total current measurement constitutes a sample INVY.

Driving the touchscreen 105 in this way (using the amplitude ramped AC field) causes an unbalanced communicatively coupled load across the touchscreen 105. Any capacitance added or removed (as with a user's touch) will be linearly coupled from full scale to zero, and inject a charge, depending on the position of touch on the screen. The total current flow I (from all the corners) may then be viewed as having a resistive component and an unbalanced capacitive component: total current flow $I=I_{XRES}+I_{XC(unbalanced)}$. Then, after the measurements X, INVX, Y, and INVY are generated using the total current summing circuitry 110, they are then provided to a resistance based current subtraction circuitry 120. The resistive component of the total current is then subtracted away, leaving only the unbalanced capacitive component: $I-I_{XRES}=I_{XC(unbalanced)}$; when the currents based on the resistance of the screen $I_{XRES}$ are removed only the unbalanced current portions remain.

Touching the screen adds to the signal based on the location of the touch. This alone is not enough to determine touch location, but when compared to total impedance or coupled with an inverted axis reading a very accurate location of touch can be found. In doing this, a touch location determination circuitry 130 employs multiple readings (such as those associated with the four amplitude ramped field directions associated with X, INVX, Y, and INVY). It is also noted here that, although this embodiment is depicted with respect to 2 directions (e.g., X and Y), this technology could easily be adapted and applied with respect to only a single axis (e.g., only X or only Y) with even reduced complexity. For example, an analogous implementation could be applied to a single axis device that could employ some uni-directional user interface (e.g., slide bars) whose location/position is selected by a user.

Figure 2:
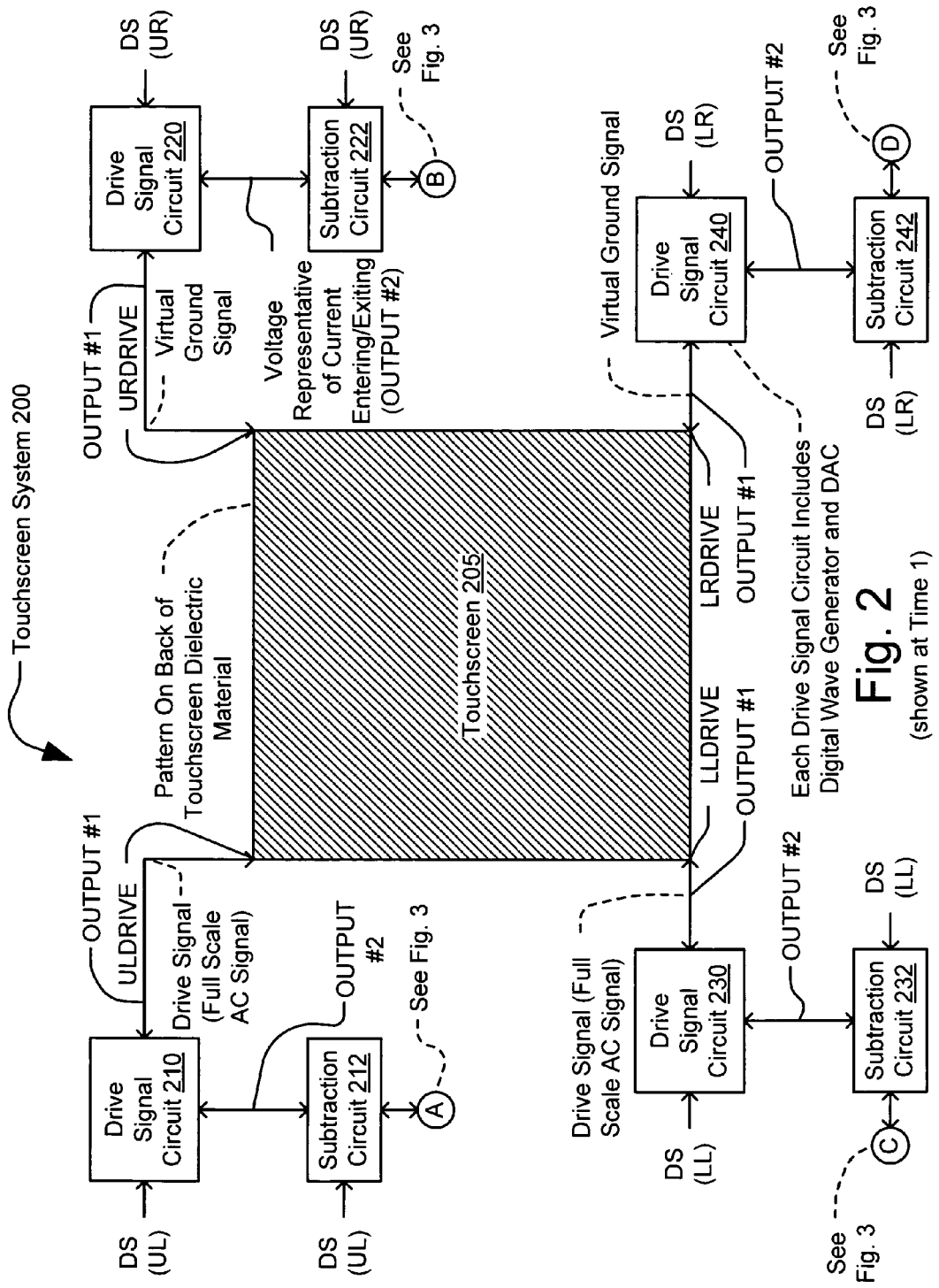
FIG. 2 is a system diagram illustrating an embodiment of a touchscreen system that is built in accordance with certain aspects of the invention.

FIG. 2 is a system diagram illustrating an embodiment of a touchscreen system 200 that is built in accordance with certain aspects of the invention. The FIG. 2 may be viewed as being a snapshot of a touchscreen system at time 1 as described with respect to the FIG. 1. However, other time instances clearly may also occur in which the other of the times shown in the FIG. 1 may also occur.

Corners of a touchscreen 205 are provided with signals from drive signal circuits. The UL corner has a drive signal circuit 210; the UR corner has a drive signal circuit 220; the LL corner has a drive signal circuit 230; and the LR corner has a drive signal circuit 240. The drive signal circuits 210, 220, 230, and 240 also operate as current sensors at the corners of the touchscreen 205. Even though current is effectively injected into each of the four corners of the touchscreen 205 by the drive signal circuits 210, 220, 230, and 240, there is also current that exits from each of the four corners as well. A digital wave generator chip, having a built in DAC, is operable to supply a wave function having a particular amplitude to the corner driver circuits by way of a digitally controlled amplitude circuit. In one embodiment, a digital sine wave generator chip with a built in DAC may be employed to supply a processor programmable spectrally pure sine wave of fixed amplitude to the corner driver circuits by way of a digitally controlled amplitude circuit. Each of the drive signal circuits 210, 220, 230, and 240 may be implemented such that they can deliver a low impedance zero signal to full scale amplitude with 8 bits of resolution to the corner drive circuits. It is also noted here that the frequency of the signals provided by the various digital wave generator chips may be different. There may be some embodiments where the signals generated in the X and Y directions are the same (e.g., having a similar signal shape, amplitude, phase, and frequency); however, multiple signals that are different may also be employed (e.g., having different signal shapes, amplitudes, phases, and/ or frequencies). For one example of an alternative embodiment, a DSP (Digital Signal Processor) may be employed to generate each of the different signals that are provided to corresponding DACs. In one instance, a first frequency may be employed to drive the signals from side to side across the touchscreen, and a second frequency may be employed to drive the signals from top to bottom across the touchscreen. Other of the parameters (e.g., signal shape, amplitude, and/or phase) may also be varied for each of the differently directed signals.

Each corner of the touchscreen glass employs a comparable "DRIVER" circuit (drive signal circuits 210, 220, 230, and 240) where an applied input "drive" signal of AC potential or "ground" will drive the attached corner to the same signal level as the input signal. Each of the drive signal circuits 210, 220, 230, and 240 has two outputs. One of the outputs (output #1) is attached to the sensor glass of the touchscreen 205 and the second output (output #2) is attached to a subtraction circuit. Each of the four corners has an associated subtraction circuit shown as subtraction circuits 212, 222, 232, and 242.

Figure 3:
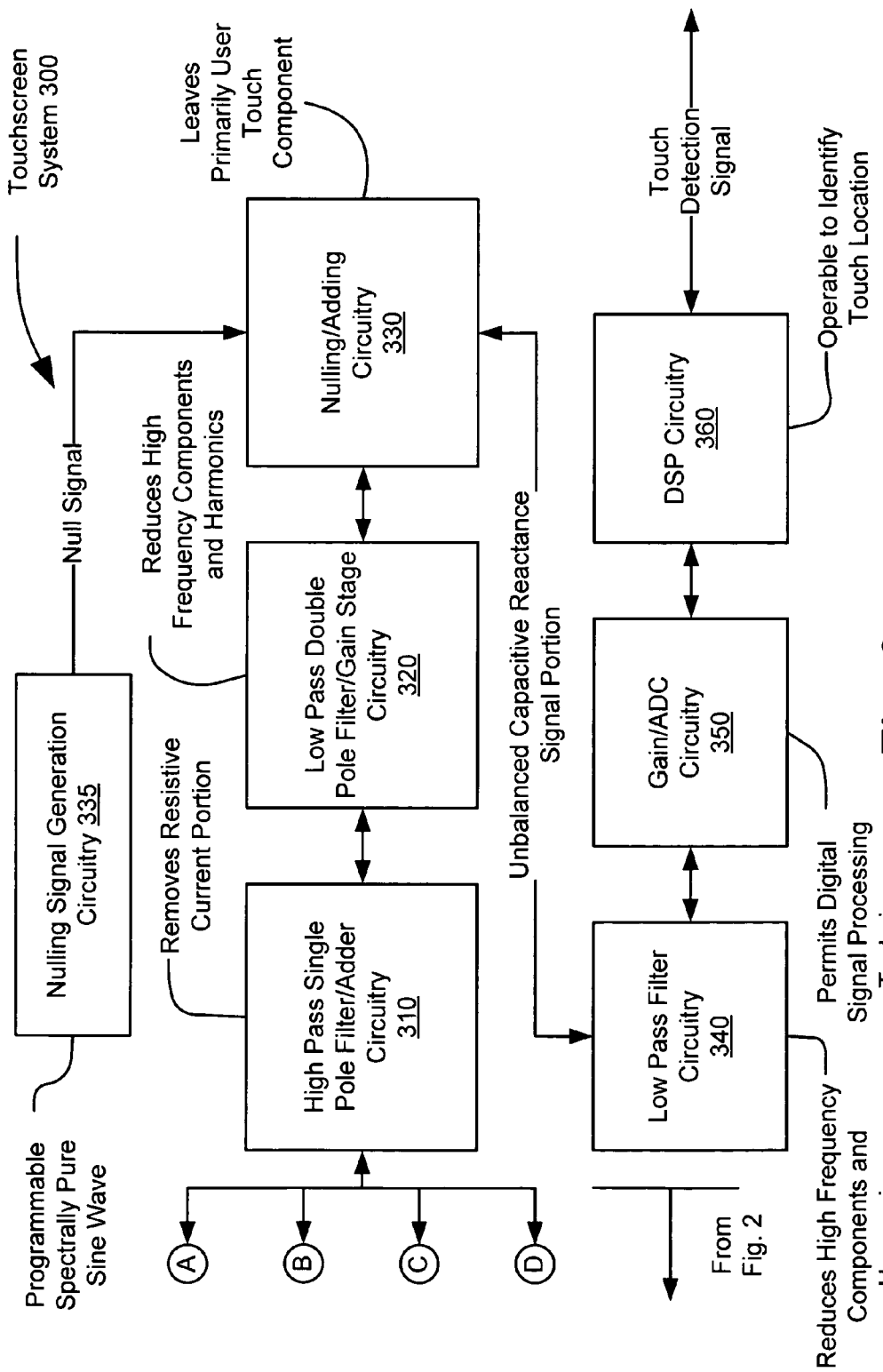
FIG. 3 is a system diagram illustrating another embodiment of touchscreen system that is built in accordance with certain aspects of the invention.

As an example, the output #2 from the UL corner is representation of the current entering and exiting output #1 plus the input "drive" signal provided by the drive signal circuit 210. The output #2 is attached to a circuit where the input "drive" signal is removed from output #1, namely, the subtraction circuit 212. The output of the subtraction circuit 212 is shown as the reference numeral A, and its destination is shown in FIG. 3. The signal provided to the subtraction circuit 212 is representative of the current entering and exiting the UL corner of the touchscreen 205. This situation may be referred to as being the sample X (or the X-axis). When an axis is energized the lower left LL corner and upper left UL corner "DRIVER" circuits (drive signal circuits 210 and 230) are driven with an AC voltage of the same polarity on their respective input "drive" signals, both corners being referred to as HIGH SIDE. The ground side of the touchscreen 205, the upper right UR and lower right LR "DRIVER" circuits (drive signal circuits 220 and 240) are driven to "ground", both corners being referred to as LOW SIDE.

On the HIGH SIDE, the AC signal out of the "DRIVER" circuit output#2 will represent the total current flowing in and out of that corner plus the voltage of the applied input "drive" signal. When the input drive signal is stripped off or subtracted from output#2, using the subtraction circuitry, then the remaining signal will be a voltage representation of only the current flowing through the corner of the screen attached to output# 1.

On the LOW SIDE, the AC signal out of the "DRIVER" circuit output#2 will represent the total current flowing in and out of that corner plus the voltage of the applied input "drive" signal (which is zero). When the input drive signal is stripped off or subtracted from output#2 then the remaining signal will be a voltage representation of only the current flowing through the corner of the screen attached to output#1. Since the circuit is operating with a DC or ground input the circuit becomes a virtual ground on its output#1. Output#2 will therefore contain an AC voltage representation of only the current flowing through the corner of the screen attached to output#1 but opposite in phase of the signals driving the HIGH SIDE circuits.

The outputs of the four subtraction circuits 212, 222, 232, and 242 (shown as reference numerals A, B, C, and D) are all provided to a high pass single pole filter/adder circuitry 310 as shown and described below in FIG. 3.

FIG. 3 is a system diagram illustrating another embodiment of touchscreen system 300 that is built in accordance with certain aspects of the invention. Again, the outputs of the four subtraction circuits 212, 222, 232, and 242 in the FIG. 2 (shown as reference numerals A, B, C, and D in the FIG. 2) are all provided to the high pass single pole filter/adder circuitry 310. Again, all of the outputs from all of the four corners of a touchscreen are treated similarly, in that, they each pass through a respective subtraction circuit, and they are all then passed simultaneously to the high pass single pole filter/adder circuitry 310 where the individual corner signals are passed through a high pass single pole filter and added together. The high pass filtering occurs due to AC coupling between the stages with a lower cutoff frequency around some selected frequency. This frequency may be in the range of 15 kHz (kilo-Hertz) in some embodiments. Adding the outputs of the HIGH SIDE and LOW SIDE driver circuits effectively removes the current portion of the signal due solely to the resistance across the touchscreen, leaving only the unbalanced reactive portion of the current as a voltage signal. Again, it is this unbalanced reactive portion that is most greatly indicative of a user's touch.

The output of the high pass single pole filter/adder circuitry 310 is fed to a low pass double pole filter/gain stage circuitry 320. At this point a single signal, output from the low pass double pole filter/gain stage circuitry 320, containing only the unbalanced reactive current, is amplified by some factor and is fed into a double pole low pass filter; the amplification factor may be 10 in certain embodiments. The low pass filter at this stage includes an upper cutoff frequency that is appropriately selected to reduce high frequency interference/noise. For example, this upper cutoff frequency may be in the 80 kHz range or even higher in the 500 kHz range (or even higher) in alternative embodiments.

The output of the low pass double pole filter/gain stage circuitry 320 is provided to a nulling/adding circuitry 330. In addition, a nulling signal generation circuitry 335 provides a null signal to the nulling/adding circuitry 330. A digital sine wave generator chip with a built in DAC will supply a processor programmable spectrally pure sine wave of varying amplitude and phase to the nulling/adding circuit 330. The unbalanced reactive load on the touchscreen will take the form of a sine wave with a phase shift from the primary touchscreen drive signal. The amplitude and phase of the signal will be the integration of all the unbalanced capacitive reactance in the circuit. This includes the background grounding capacitive reactance of the screen and any user touch reactance. Measuring this signal without a touch and removing it (nulling) leaves only the current associated with the user's touch; it is then left in the form of amplitude changes to the signal.

By generating a sine wave −180 degree phase with and of similar amplitude and adding the touchscreen signal can be almost completely zeroed. The remaining signal will contain some unbalanced capacitive reactance. Any changes to this signal will be due to a number of parameters including noise induced into the touchscreen or circuit, temperature variations to the circuits or touchscreen, humidity variations to the circuit or touchscreen, and a user's touch of the touchscreen. The change associated with a user's touch is of high desirability in discerning the location of a user's touch. This signal portion, associated with the unbalanced capacitive reactance, is then provided to a final low pass filtering circuitry 340. The low pass filtering circuitry 340 includes an upper cutoff frequency that is appropriately selected to reduce high frequency interference/noise. For example, this upper cutoff frequency may be in the 80 kHz range or even higher in the 500 kHz range (or even higher) in alternative embodiments. At this point, the waveform should be very pure spectrally. The final output will also be scaled appropriately for the analog input stage to follow.

A gain/analog to digital converter (ADC) circuitry 350 operates on the remaining signal to clamp it to ground and to send it through a processor-controlled variable gain amplifier having a dynamic range of approximately 0-36 dB. The processor is operable to test the signal and to amplify it to some range near full scale of the awaiting 20MSPS 12BIT ADC. Now that the signal is in digital format, the invention is operable to employ DSP techniques (using DSP circuitry 360) to discriminate a user's touch and its location on a touchscreen.

Figure 4:
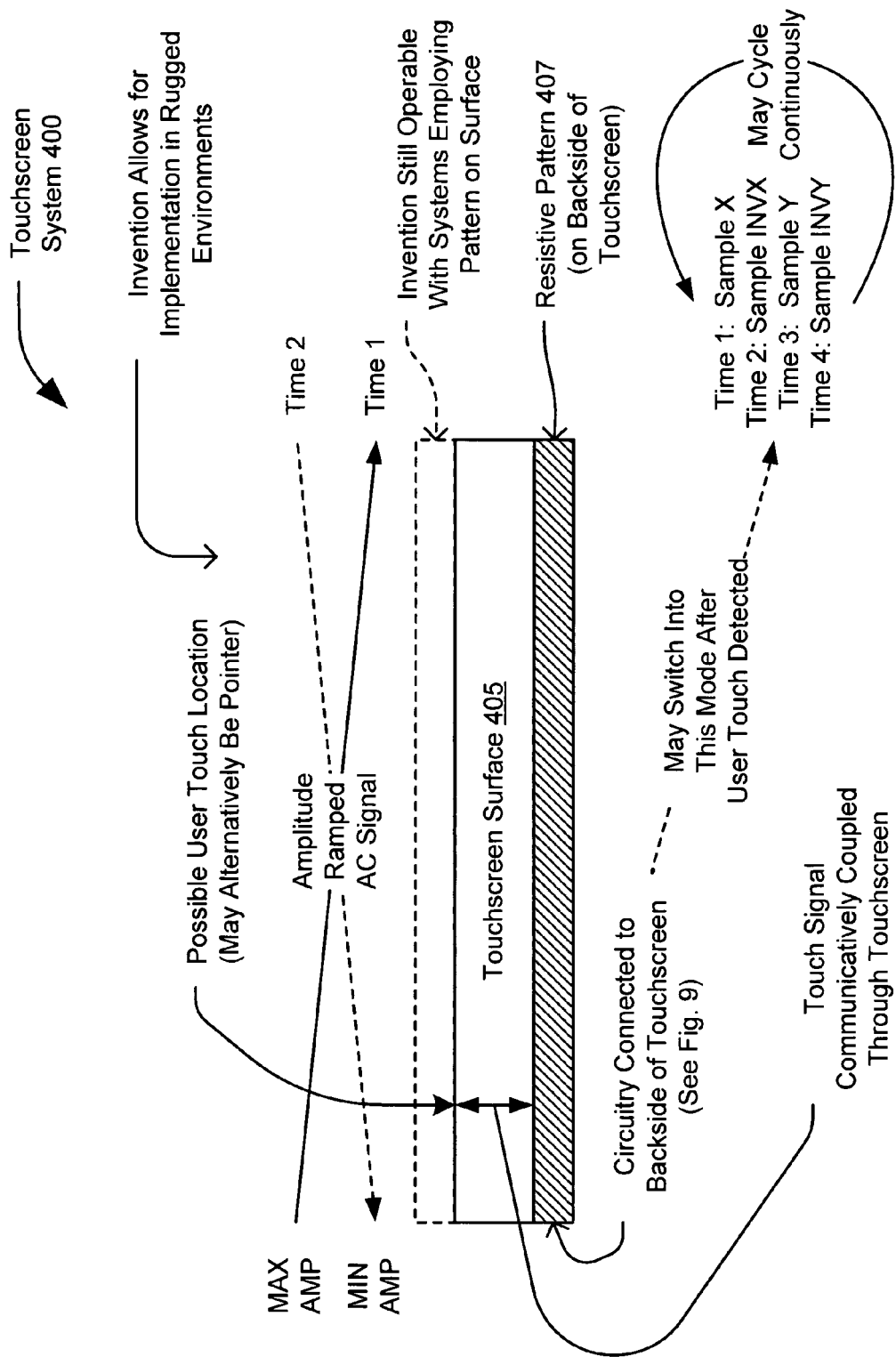
FIG. 4 is a system diagram illustrating another embodiment of a touchscreen system that is built in accordance with certain aspects of the invention.
Figure 9:
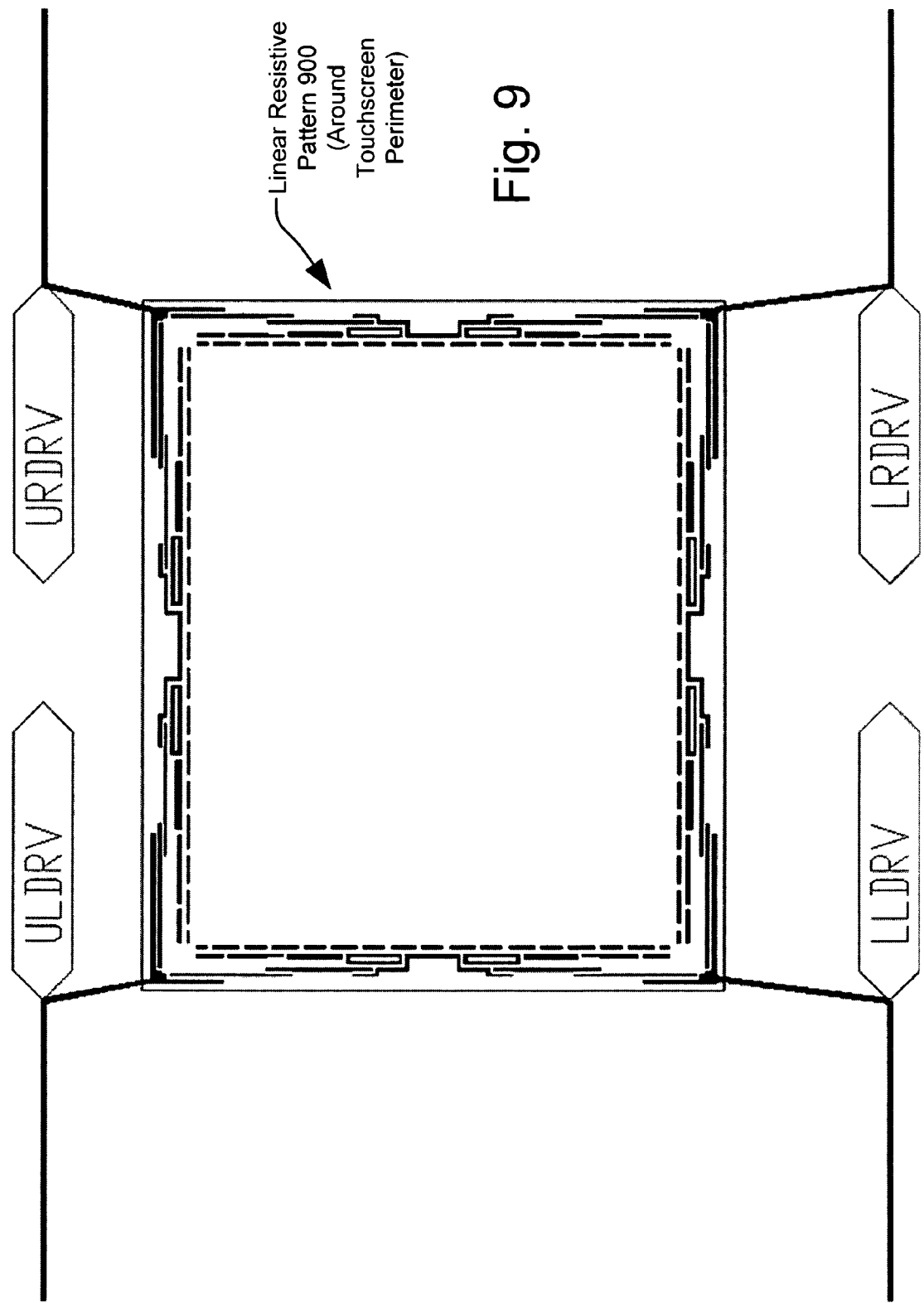
FIG. 9 is a diagram illustrating an embodiment of a linear resistive pattern that is arranged around the perimeter of a touchscreen that is built in accordance with certain aspects of the invention.

FIG. 4 is a system diagram illustrating another embodiment of a touchscreen system 400 that is built in accordance with certain aspects of the invention. The touchscreen system 400 shows a touchscreen surface 405 that a user is able to contact to select any number of options. A linearized resistive pattern 407 is on the backside of the touchscreen surface 405. It is noted that the linearized resistive pattern 407, as well as any other resistive pattern and/or linear resistive pattern described herein, may be viewed as being situated on top of a conductive coating. As one example, the linearized resistive pattern 407 may be imaged or printed onto a conductive Indium Tin Oxide (ITO) coating. For example, the linearized resistive pattern 407 may be some type of metal ink of low resistance printed on any higher sheet resistance conductor. The resistance typically referred to in terms of a certain resistance per unit area (e.g., Q/11). It is the particular patterning (spaces and conductors as shown in FIG. 9) of the resistive pattern 407 on the sheet conductor that linearizes the impedance across the touchscreen.

As the linearized resistive pattern 407 is energized on the backside of the touchscreen surface 405 using circuitry connected to the linearized resistive pattern 407, an amplitude ramped field, shown as an amplitude ramped AC signal, is then communicatively coupled through the touchscreen surface 405 so that a user's touch will in fact affect the amplitude ramped field thereby enabling the touchscreen system 400 to detect the location of a user's touch. Again, it is also noted that the invention is still operable within touchscreen systems that desire to employ a resistive pattern on the surface of the touchscreen surface 405. However, it is understood that by employing the linearized resistive pattern 407 on the backside of the touchscreen surface 405, then the touchscreen system 400 is operable within many different applications including those within rugged and stressful environments.

It is noted here that the user's touch to the touchscreen is actually on the opposite side of the touchscreen on which where the linearized resistive pattern 407 is implemented. In effect, it is the modification of the field amplitude ramped field by the user's presence that is detected; the amplitude ramped field actually projects out of the front of the touchscreen surface 405 (i.e., the amplitude ramped field projects through the touchscreen surface 405). The linearized resistive pattern 407 is not actually physically touched by the user (as the touchscreen surface 405 is interposed between the user interface and the linearized resistive pattern 407). This capability of not requiring an actual physical touch to the linearized resistive pattern 407 allows a much broader range of application areas when compared to prior art approaches and designs.

This capability may be viewed as being that of a 3-D (three-dimensional) capable sensing device. As one example, a user's presence may be detected a particular distance away from the touchscreen surface 405 itself. This capability is very desirable in the medical industry, where many medical professionals have their hands enclosed in protective plastic gloves at times, and it is burdensome to remove gloves to interact with such a touchscreen system 400, then subsequently put on additional gloves to continue with the medical services or tasks at hand. Some other desirable application areas would be where a user's hands (and/or gloves) are often soiled or dirty. For example, in the oil industry, the hands of various users may be oily, and it would be very desirable to employ such a 3-D capable device to allow user interaction without actually requiring the user physically to touch the touchscreen, but merely to interact closely with it. Clearly, there are a wide variety of application areas where this 3-D sensing capability would be desirable. Certain aspects of the invention have demonstrated this 3-D capability to detect a user's hand at approximately 6 inches from the surface of a touchscreen surface.

As also described in other sections, the direction of an amplitude ramped field may be switched during operation of the touchscreen system 400. For example, at a time 1, a sample X may be taken. At a time 2, a reversed amplitude ramped field may provide for a sample INVX to be taken. The amplitude ramping of the amplitude ramped field is shown at times 1 and 2 in the FIG. 4.

Similarly, the direction of the amplitude ramped field may be changed yet again (vertically: top to bottom) for a sample Y to be taken at a time 3 and for a sample INVY at a time 4 to be taken when the field is changed yet again (vertically: bottom to top). A number of samples may be taken for each of the sample X, INVX, Y, and INVY to provide greater certainty of the measurement. The touchscreen system 400 may cycle continuously through the above-described embodiment by taking and monitoring the four samples first to detect the existence of a user's touch and second to discriminate the location of a user's touch.

For example, the system may operate in one mode (a power savings mode) when no user touch is detected for a period of time. Samples would be taken less often with periods of minimal power draw between samples (Z axis combined with periods of no drive to the corners of the touchscreen). Then, after the touchscreen system 400 does detect a user's touch, then the system could enter into the sampling of the X, INVX, Y, and INVY measurements and then cycle continuously for a period of time during which there is in fact user interaction. Then, after a period of time when there is no detected user interaction, the touchscreen system 400 could enter into a power savings mode again.

Figure 5:
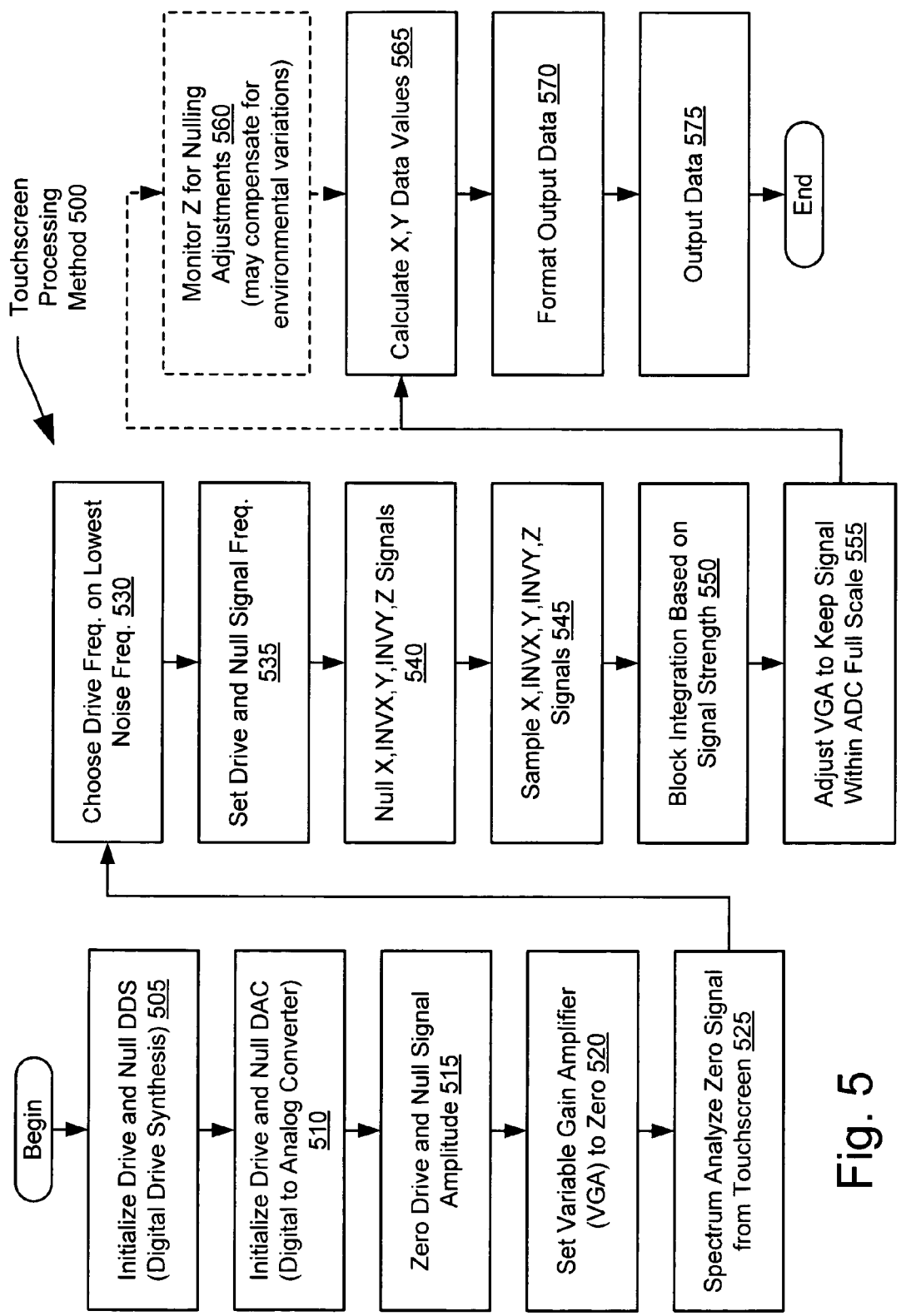
FIG. 5 is a functional block diagram illustrating an embodiment of a touchscreen processing method that is performed in accordance with certain aspects of the invention.

FIG. 5 is a functional block diagram illustrating an embodiment of a touchscreen processing method 500 that is performed in accordance with certain aspects of the invention. From certain perspectives, the touchscreen processing method 500 may be viewed as being digital processing and digitally controlled processing. In block 505, the drive and Direct Digital Synthesis (DDS) are initialized. Then, in block 510, the drive and null digital to analog convert (DAC) are initialized. In block 515, the drive and null signal amplitude are zeroed. In block 520, a variable gain amplifier (VGA) is set to zero. In block 525, the zero signal from the touchscreen is spectrum analyzed. In block 530, the drive frequency having the lowest noise, within a particular frequency range is selected. For example, this frequency range may be between 50 kHz and 150 kHz in one embodiment. Then, in a block 535, the drive and null signal frequency are set.

In block 540, the signals X, INVX, Y, INVY, Z are nulled. In performing the nulling of the signals, the phase and amplitude of the drive signal is tested. The null phase and amplitude are adjusted to cancel the drive signal at the ADC. Then, the null offset phase and amplitude data are stored for each signal. The VGA is then adjusted so that the signal is approximately half ADC scale.

Then, the signals X, INVX, Y, INVY, Z are then sampled in block 545. The drive signals are set, and the null phase offset and amplitude are also set. The ADC is read where readings for one or more full cycles of drive frequency constitute a block. The data will be handled in blocks based on frequency and the ADC speed. The data are read in from the ADC to DSP random access memory (RAM). Processing is performed on the data block to find the amp, phase, and magnitude (APM) of the data. Then the values corresponding to A, P, M are stored. Then, in block 550, block integration is performed based on the signal strength. The VGA is adjusted in block 555 to keep the signal inside of the ADC's full scale. The DSP is operable to perform any other desired filtering of the data.

Now, the monitoring of the Z axis may be viewed as being an alternative embodiment in certain situations. The Z is made by driving the four corners of the touchscreen with the same amplitude signal. No current is driven across the screen and no orthogonal touch position information is available. The Z need not always be monitored for proper system performance. However, Z may be monitored, as shown in an alternative block 560 for identifying Nulling adjustments. The Z may be monitored for relatively slowly changing parameters such as those associated with slowly changing environmental conditions including temperature and humidity conditions that may affect the operating points of the various circuitry employed within the system. In addition, Z may be used to operate a touchscreen system within an energy conservation mode and then when a change is determined, then the touchscreen system may enter into user touch location identification sequence.

Whether or not Z is monitored, the touchscreen processing method 500 continues to calculate X, Y data values as shown in a block 565. In doing so, the X position and Y positions are calculated as follows:

$$Xpos = \frac{X}{(X + INVX)}$$

$$Ypos = \frac{Y}{(Y + INVY)}$$

These equations do not include touch null offsets. It is also noted that values of X and INVX generally represent a touchscreen's unbalanced capacitive load $X_{UNBAL}$ (including any user touch induced unbalanced capacitive load $X_{TOUCH}$) but are equivalent in amplitude.

If we instead desire to include the effects of the nulling (and also separating the touchscreen's unbalanced capacitive load portion with the unbalanced capacitive load portion associated with a user's touch), then the following equations could be used.

$$Xpos = \frac{(X_{UNBAL} + X_{TOUCH} - X_{NULL})}{(X_{UNBAL} + X_{TOUCH} - X_{NULL}) + (INVX_{UNBAL} + INVX_{TOUCH} - INVX_{NULL})}$$

$$Ypos = \frac{(Y_{UNBAL} + Y_{TOUCH} - Y_{NULL})}{(Y_{UNBAL} + Y_{TOUCH} - Y_{NULL}) + (INVY_{UNBAL} + INVY_{TOUCH} - INVY_{NULL})}$$

Then, in a block 570 the data is formatted and output in a block 575.

Regarding the block data acquisition and processing, it is noted that the drive signal will be set at a known phase angle and data will be acquired into the DSP memory. The data acquired will be some number of samples of data per cycle of the drive signal based on the ADC speed, cycle length, and the available RAM. Data acquisition and storage typically be the slowest operation by the processor by a relatively large margin. Once in memory, spectral analysis/frequency analysis calculations will be performed on the block of data resulting in amp, phase, and magnitude (APM) readings for that block of data. Several blocks will be processed if necessary in this manner and the APM readings integrated into total APM readings. Block readings will be performed on all necessary signals (X, INVX, Y, INVY, Z) until a total data set has been acquired. The number of blocks integrated may vary but will remain consistent across a set of signal readings.

Figure 6:
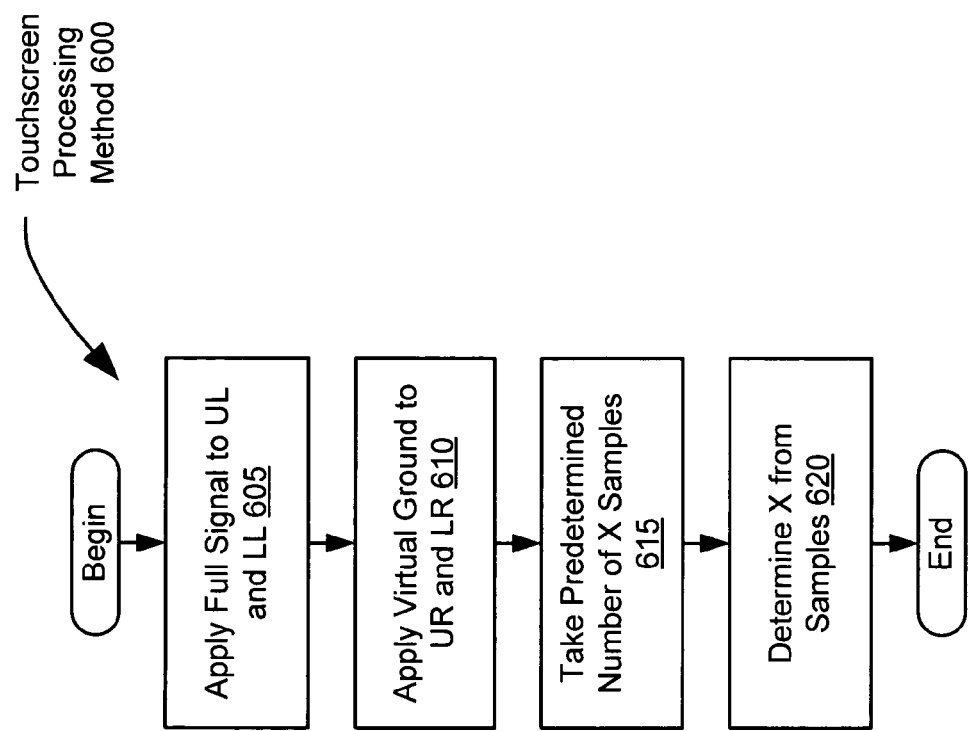
FIG. 6 is a functional block diagram illustrating another embodiment of a touchscreen processing method that is performed in accordance with certain aspects of the invention.

FIG. 6 is a functional block diagram illustrating another embodiment of a touchscreen processing method 600 that is performed in accordance with certain aspects of the invention. In a block 605, a full signal is applied to the upper left UL and the lower left LL corners of a touchscreen. In a block 610, a virtual ground is applied to the upper right UR and lower right LR corners of the touchscreen. A predetermined number of samples are taken of the four corners of the touchscreen as shown in a block 615 for the sample X. Then, an actual value for the X sample is determined using the predetermined number of samples as shown in a block 620.

The FIG. 6 shows the embodiment of the invention where an amplitude ramped field is generated and ramps from the left hand side to the right hand side across the touchscreen. As will be shown in FIG. 7 below, other aspects of the invention also include various methods that operate to change the direction of the amplitude ramped field across the touchscreen at various instances in time.

Figure 7:
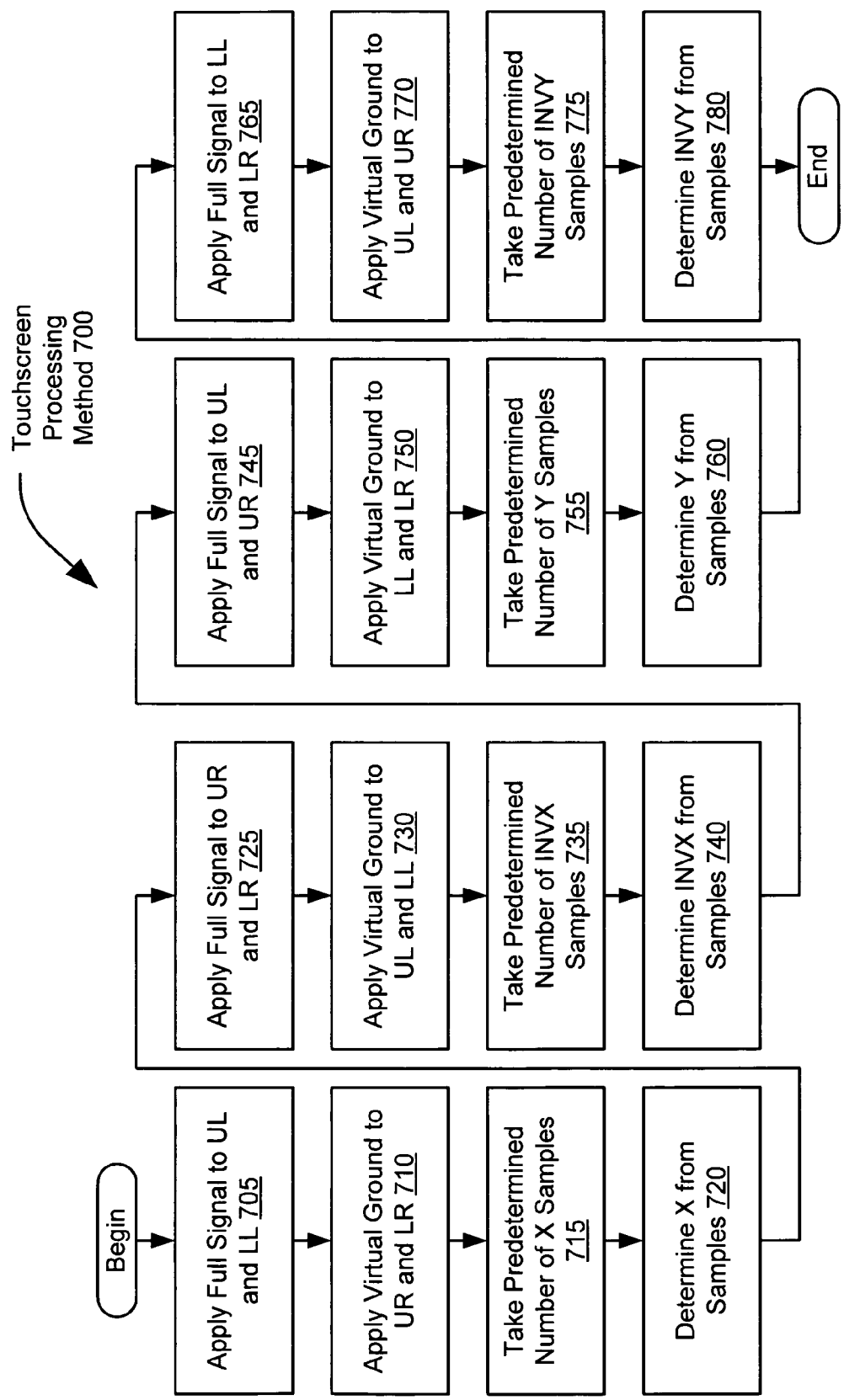
FIG. 7 is a functional block diagram illustrating another embodiment of a touchscreen processing method that is performed in accordance with certain aspects of the invention.

FIG. 7 is a functional block diagram illustrating another embodiment of a touchscreen processing method 700 that is performed in accordance with certain aspects of the invention. In a block 705, a full signal is applied to the upper left UL and the lower left LL corners of a touchscreen. In a block 710, a virtual ground is applied to the upper right UR and lower right LR corners of the touchscreen. A predetermined number of samples are taken of the four corners of the touchscreen as shown in a block 715 for the sample X. Then, an actual value for the X sample is determined using the predetermined number of samples as shown in a block 720.

In a block 725, a full signal is applied to the upper right UR and the lower right LR corners of the touchscreen. In a block 730, a virtual ground is applied to the upper left UL and the lower left LL corners of the touchscreen. A predetermined number of samples are taken of the four corners of the touchscreen as shown in a block 735 for the sample INVX. Then, an actual value for the INVX sample is determined using the predetermined number of samples as shown in a block 740.

In a block 745, a full signal is applied to the upper left UL and the upper right UR corners of the touchscreen. In a block 750, a virtual ground is applied to the lower left LL and the lower right LR corners of the touchscreen. A predetermined number of samples are taken of the four corners of the touchscreen as shown in a block 755 for the sample Y. Then, an actual value for the Y sample is determined using the predetermined number of samples as shown in a block 760.

In a block 765, a full signal is applied to the lower left LL and the lower right LR corners of the touchscreen. In a block 770, a virtual ground is applied to the upper left UL and the upper right UR corners of the touchscreen. A predetermined number of samples are taken of the four corners of the touchscreen as shown in a block 775 for the sample INVY. Then, an actual value for the INVY sample is determined using the predetermined number of samples as shown in a block 780.

The FIG. 7 shows the embodiment of the invention where an amplitude ramped field is generated and ramps in four different directions across the touchscreen to generate the measurements X, INVX, Y, and INVY. All four of the measurements may be used to discriminate precisely the location of a user's touch on the touchscreen. In addition, the order in which the measurements of the values X, INVX, Y, and INVY may be re-arranged without departing from the scope and spirit of the invention.

Figure 8:
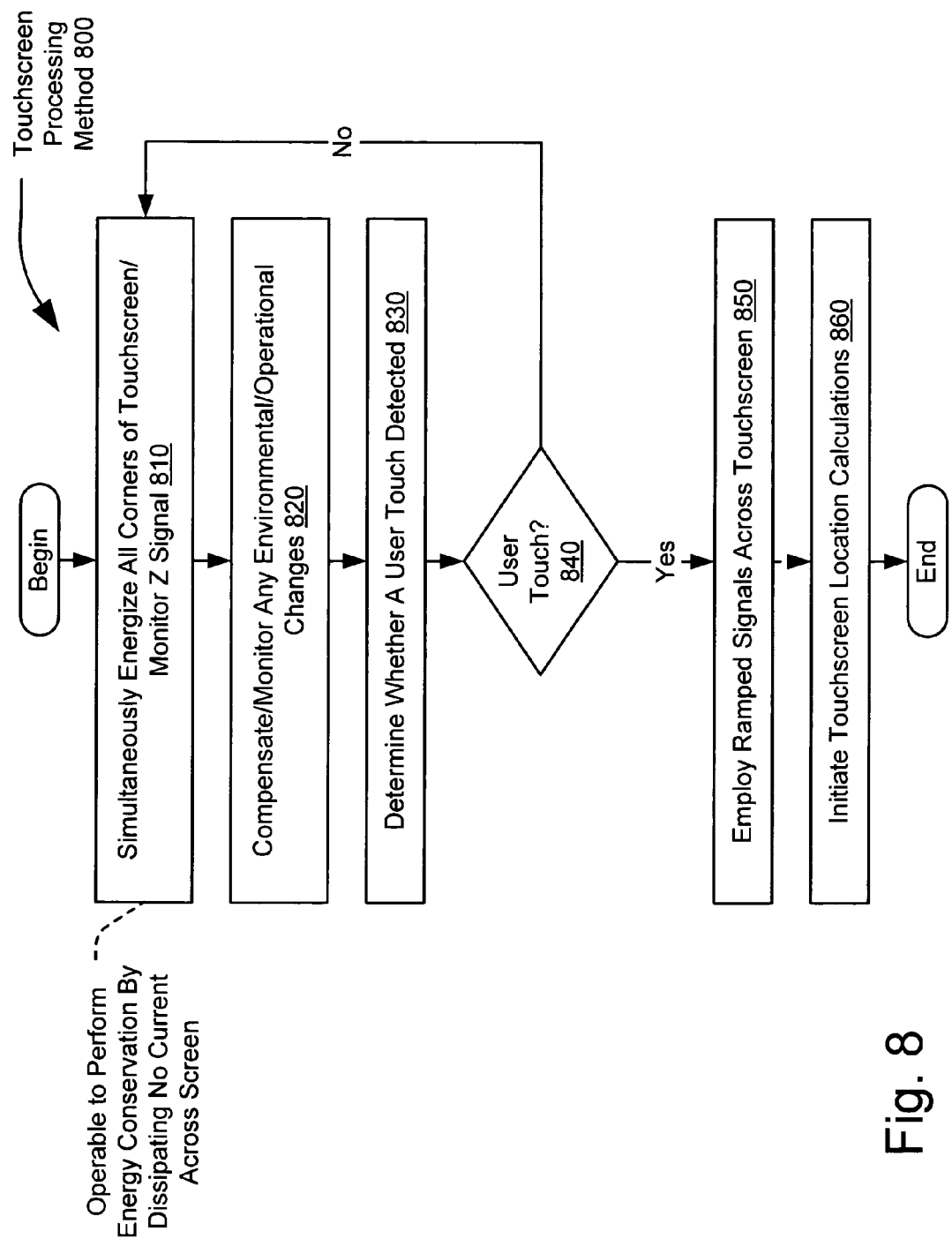
FIG. 8 is a functional block diagram illustrating another embodiment of a touchscreen processing method that is performed in accordance with certain aspects of the invention.

FIG. 8 is a functional block diagram illustrating another embodiment of a touchscreen processing method 800 that is performed in accordance with certain aspects of the invention. In a block 810, all the corners of a touchscreen are simultaneously energized and a Z signal is monitored. This mode of operation enable energy conservation by dissipating no current across the screen; this mode of operation may be used when there has been a period of time in which there has been no user touch.

In a block 820, the Z measurement may be used to compensate for and monitor any environmental changes. This may also be used to perform any operational changes as well. These changing environmental changes may be stored and the touchscreen system may then modify its operational points to accommodate such environmental changes. The drift or changes of the environmental changes may be stored in a memory, so that the system is able to adapt, in real time, to the changing environmental conditions based on earlier conditions.

Then, in a block 830, it is determined whether a user touch has been detected. If it is determined that a user touch has occurred in a decision block 840, then one or more amplitude ramped signals may be employed across the touchscreen as shown in block 850. However, when it is determined that a user touch has not in fact occurred in the decision block 840, then the touchscreen processing method 800 returns to the operations within the block 810.

The Z block data and its processing may be employed for monitoring changes. One such situation is when no user touch is present on the touchscreen. There may be several reasons for this. One such reason is that when Z is being driven, very little current is consumed on the touchscreen. Another reason is that until Z stabilizes with a touch, the VGA and the integration settings will fluctuate and any X or Y data taken will be unreliable. Yet another reason is that the Z data must be constantly monitored so that changes in reactance in the circuit and touchscreen due to temperature, humidity, noise, and changing proximity of bodies in the touchscreen electrostatic field, may be properly recorded. There are also alternative manners in which the Z data may be acquired without direct monitoring of it. It may be derived from the other measurements. For example, the Z data may also be obtained by summing the magnitudes of the X and INVX signals.

FIG. 9 is a diagram illustrating an embodiment of a linear resistive pattern 900 that is arranged around the perimeter of a touchscreen that is built in accordance with certain aspects of the invention. As described above, there are a number of various ways in which a linear resistive pattern may be arranged on a touchscreen to effectuate a linear resistive arrangement. The FIG. 9 shows one such embodiment. The electrical traces are arranged such that when an amplitude ramped AC signal is applied to the corners, the field will attenuate linearly across the touchscreen. Four different drive signals are provided to the four corners, shown as ULDRV, LLDRV, URDRV, and LRDRV. The interaction of the FIG. 9 will be described as interacting with the following Figures as well. It should be noted that the invention could be made to work without a linearization pattern instead using switched discrete points around the perimeter of the resistive sheet or using a non-linearized pattern with linear correction occurring in the digital realm.

Figure 10:
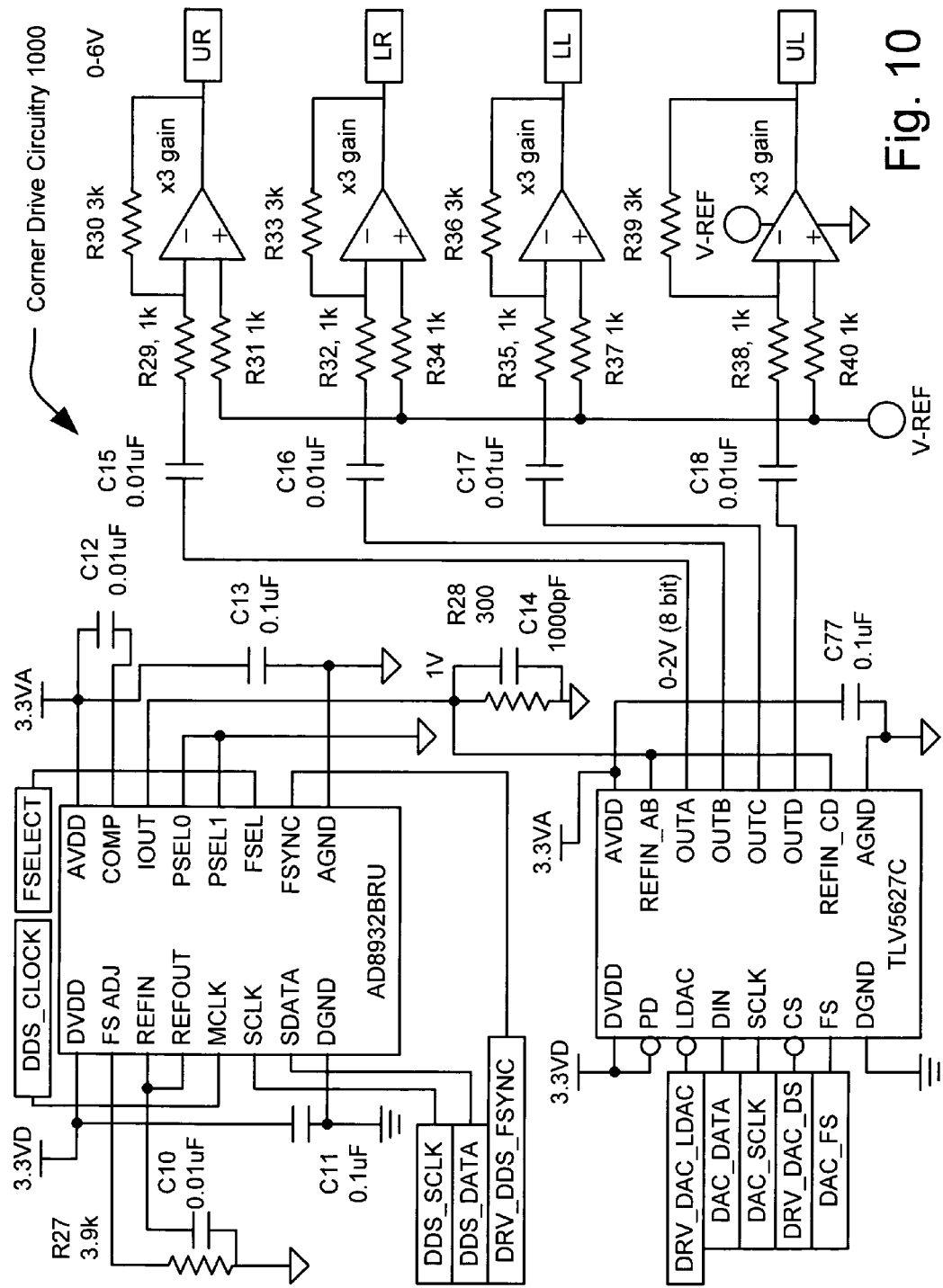
FIG. 10 is a circuitry diagram illustrating an embodiment of a corner drive circuitry that is built in accordance with certain aspects of the invention.

FIG. 10 is a circuitry diagram illustrating an embodiment of a corner drive circuitry 1000 that is built in accordance with certain aspects of the invention. The FIG. 10 shows the use of a digital sine wave generator chip with a built in DAC that is operable to supply a processor programmable spectrally pure sine wave of fixed amplitude to the corner driver circuits by way of a digitally controlled amplitude circuit (see circuitries U8 and U10). The output analog signals are provided to four comparable gain stages, shown as four operational amplifiers, from which four different output signals are provided to the four corner measurement circuits. These four outputs are shown as UR, LR, LL, and UL. Those persons having skill in the art of electrical engineering will appreciate the signal processing shown within the particular embodiment of the FIG. 10.

Figure 11:
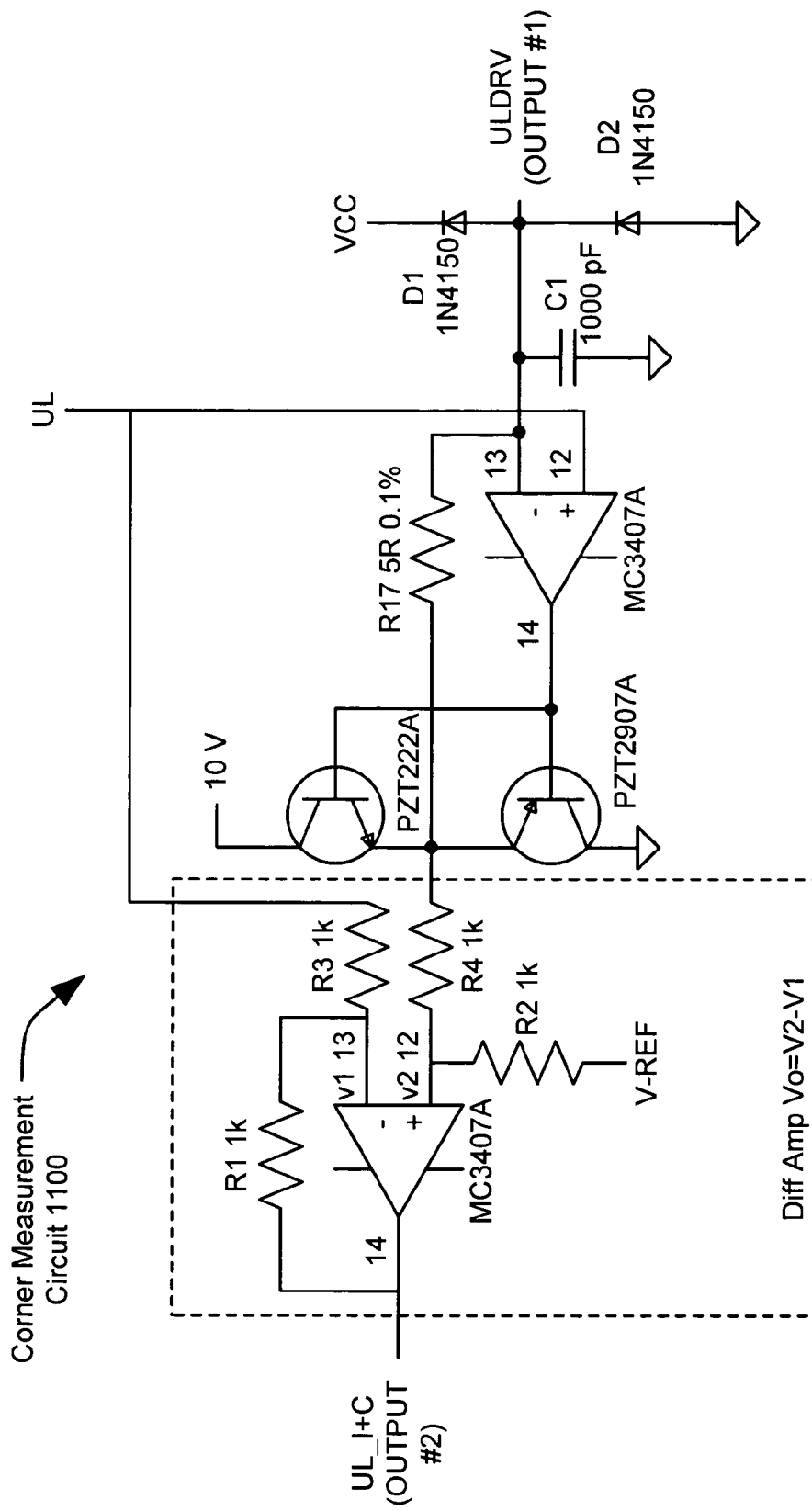
FIG. 11 is a circuitry diagram illustrating an embodiment of a corner measurement circuitry that is built in accordance with certain aspects of the invention.

FIG. 11 is a circuitry diagram illustrating an embodiment of a corner measurement circuitry 1100 that is built in accordance with certain aspects of the invention. For simplicity, only one of the four corner measurement circuitries is shown in the FIG. 11. The corner measurement circuitry 1100 may be replicated and placed at the other three corners of the linear resistive pattern 900 of the FIG. 9. The output ULDRV, from the FIG. 9, is provided as an input to the corner measurement circuitry 1100. The UL signal is provided to the corner measurement circuitry 1100 that services the upper left corner measurement circuitry 1100, and the LL signal is provided to a corner measurement circuitry that services the lower left corner measurement circuitry (not shown). This arrangement is similar with respect to the upper right and lower right corners of the linear resistive pattern 900 of the FIG. 9 as well. After undergoing the signal processing within the FIG. 11, a resultant signal UL_I+C is provided as an output from the corner measurement circuitry 1100. This signal UL_I+C includes the unbalanced capacitive reactance portion of the current measured at the upper left corner of the linear resistive pattern 900 of the FIG. 9, namely $I_{XC(unbalanced)}$. This signal UL_I+C includes the unbalanced capacitive reactance associated with the touchscreen as well as any unbalanced capacitive reactance associated with a user's touch on the touchscreen. Those persons having skill in the art of electrical engineering will appreciate the signal processing shown within the particular embodiment of the FIG. 11.

Figure 12:
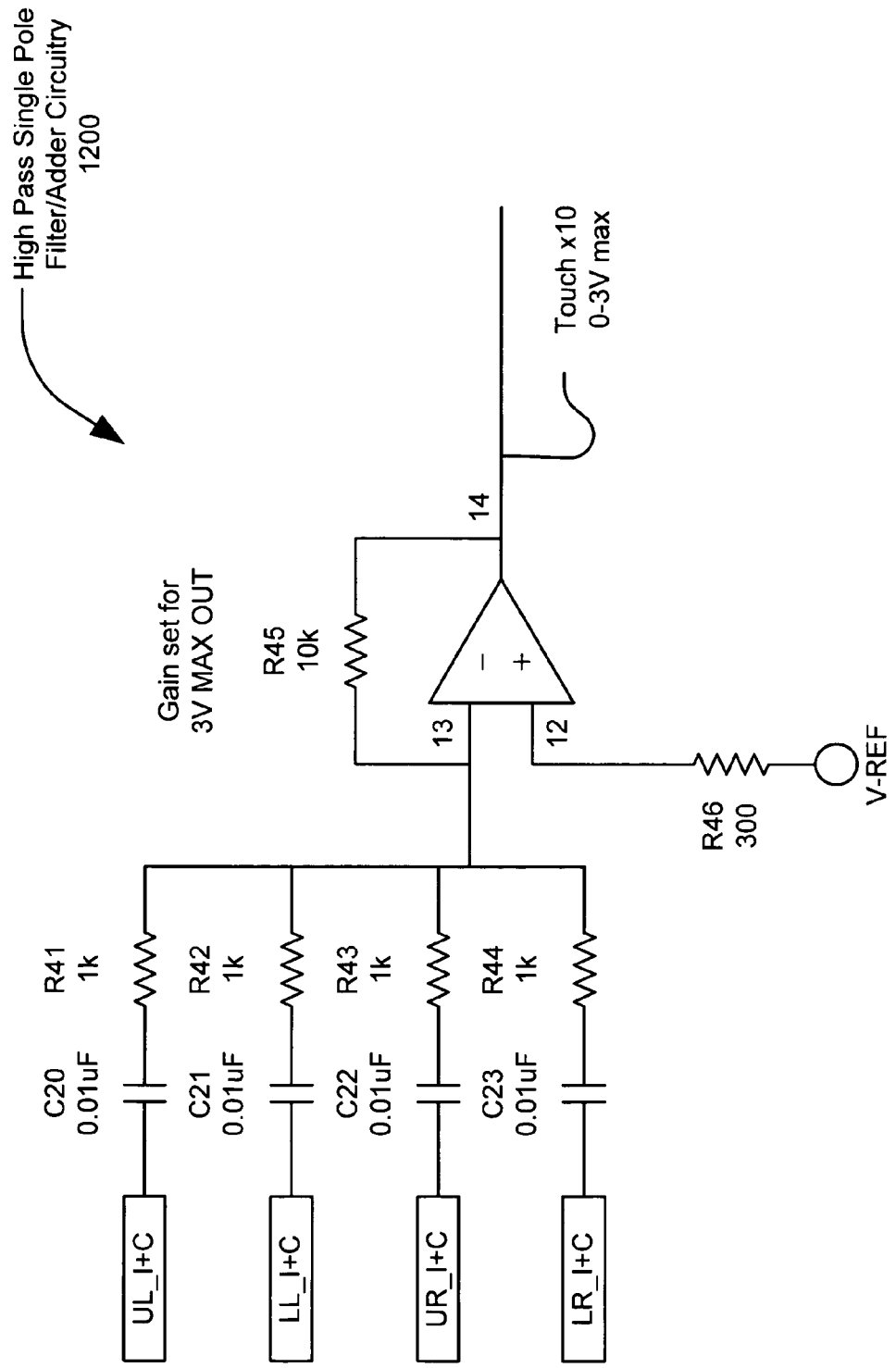
FIG. 12 is a circuitry diagram illustrating an embodiment of a high pass single pole filter/adder circuitry that is built in accordance with certain aspects of the invention.

FIG. 12 is a circuitry diagram illustrating an embodiment of a high pass single pole filter/adder circuitry 1200 that is built in accordance with certain aspects of the invention. The signal UL_I+C from the corner measurement circuitry 1100 of the FIG. 11 are provided as inputs to the high pass single pole filter/adder circuitry 1200. In addition, the signals from the corner measurement circuitries are also provided as inputs to the high pass single pole filter/adder circuitry 1200; the other inputs from the other corners are shown as LL_I+C (from the corner measurement circuitry of the lower left corner), UR_I+C (from the corner measurement circuitry of the upper right corner), and LR_I+C (from the corner measurement circuitry of the lower right corner). The signal summing functionality of the high pass single pole filter/adder circuitry 1200, within the FIG. 12, will be appreciated by those persons having skill in the art of electrical engineering. The interaction of the FIG. 12 will be also described as interacting with the following Figures as well. The individual corner signals are passed through a high pass single pole filter and added together. High pass filtering occurs due to AC coupling between stages with a lower cutoff frequency around 15 kHz. Adding the outputs of the HIGH SIDE and LOW SIDE driver circuits effectively removes the current portion of the signal due solely to the resistance across the touchscreen, leaving only the unbalanced reactive portion of the current as a voltage signal.

Figure 13:
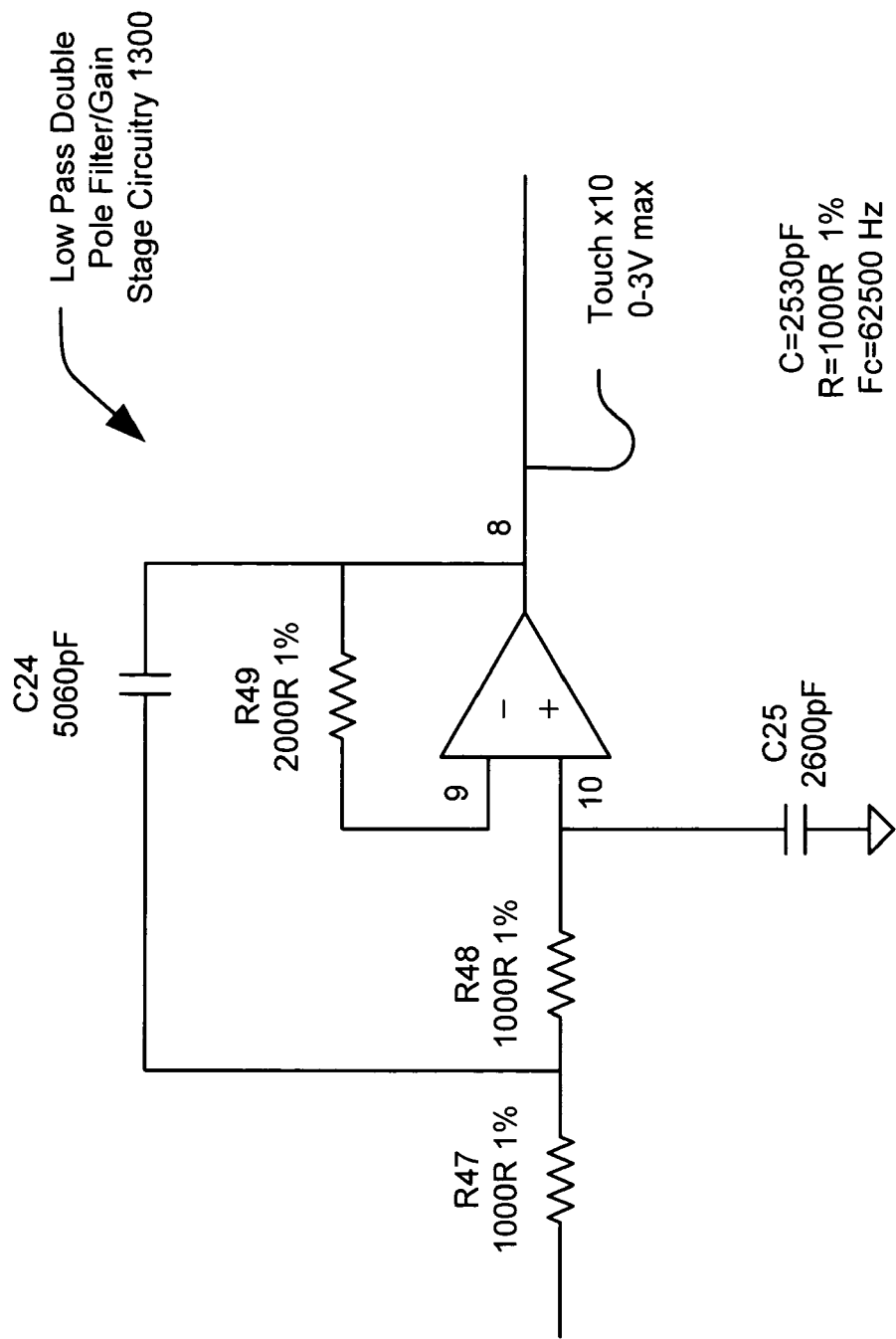
FIG. 13 is a circuitry diagram illustrating an embodiment of a low pass double pole filter/gain stage circuitry that is built in accordance with certain aspects of the invention.

FIG. 13 is a circuitry diagram illustrating an embodiment of a low pass double pole filter/gain stage circuitry 1300 that is built in accordance with certain aspects of the invention. At this point a single signal containing only the unbalanced reactive current is amplified ×10 and fed into a double pole low pass filter. The low pass filter at this stage, with an upper cutoff in a particular frequency range (e.g., the 200 kHz range in some embodiments), reduces any high frequency components and harmonics. The output signal from the high pass single pole filter/adder circuitry 1200 is provided as the input to the low pass double pole filter/gain stage circuitry 1300.

Figure 14:
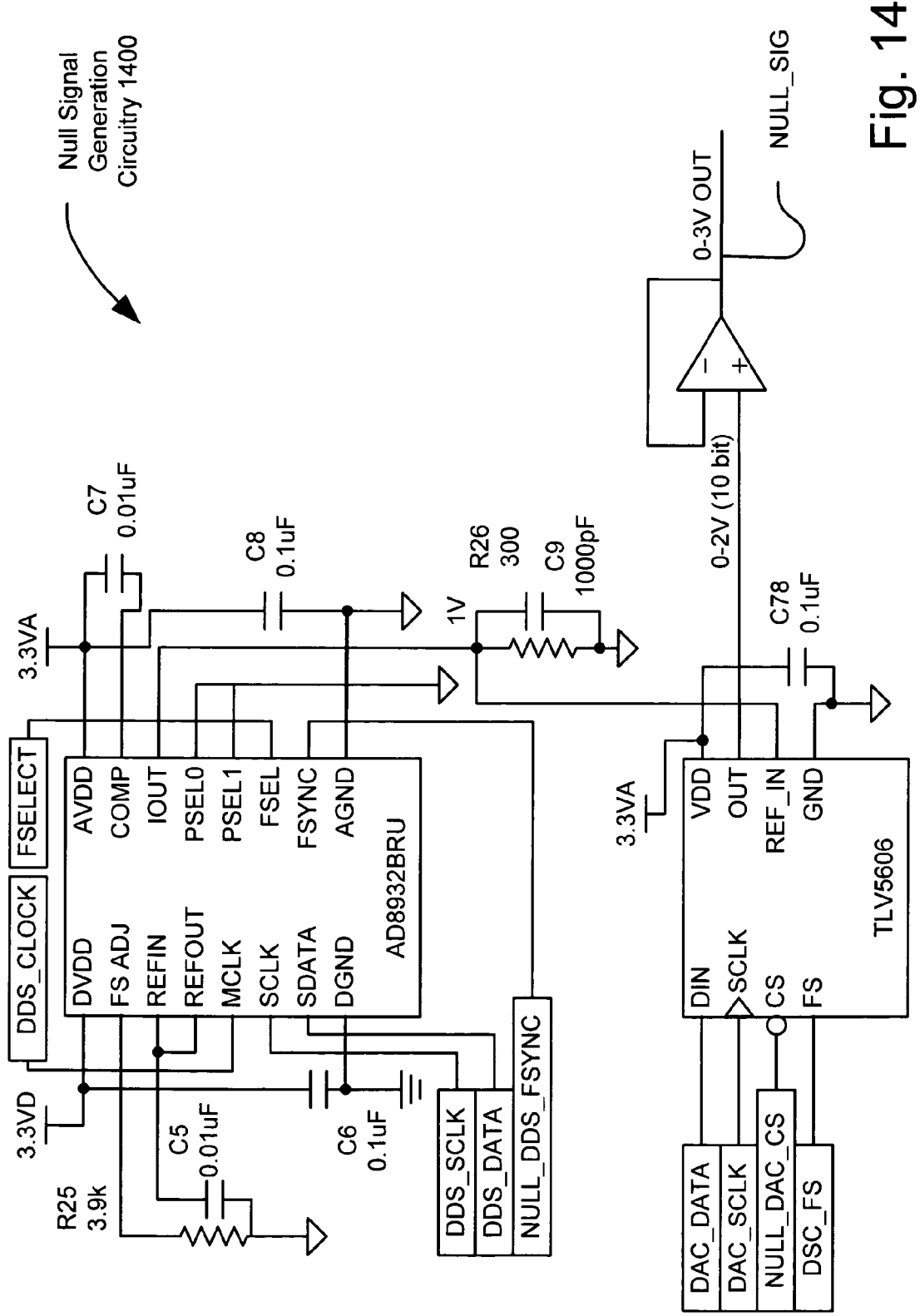
FIG. 14 is a circuitry diagram illustrating an embodiment of a null signal generation circuitry that is built in accordance with certain aspects of the invention.

FIG. 14 is a circuitry diagram illustrating an embodiment of a null signal generation circuitry 1400 that is built in accordance with certain aspects of the invention. A digital sine wave generator chip with a built in DAC will supply a processor programmable spectrally pure sine wave of varying amplitude and phase as an output from the FIG. 14. The null signal, shown as NULL_SIG, is provided as an output from the null signal generation circuitry 1400 of the FIG. 14. Those persons having skill in the art of electrical engineering will appreciate the signal processing shown within the particular embodiment of the FIG. 14.

Figure 15:
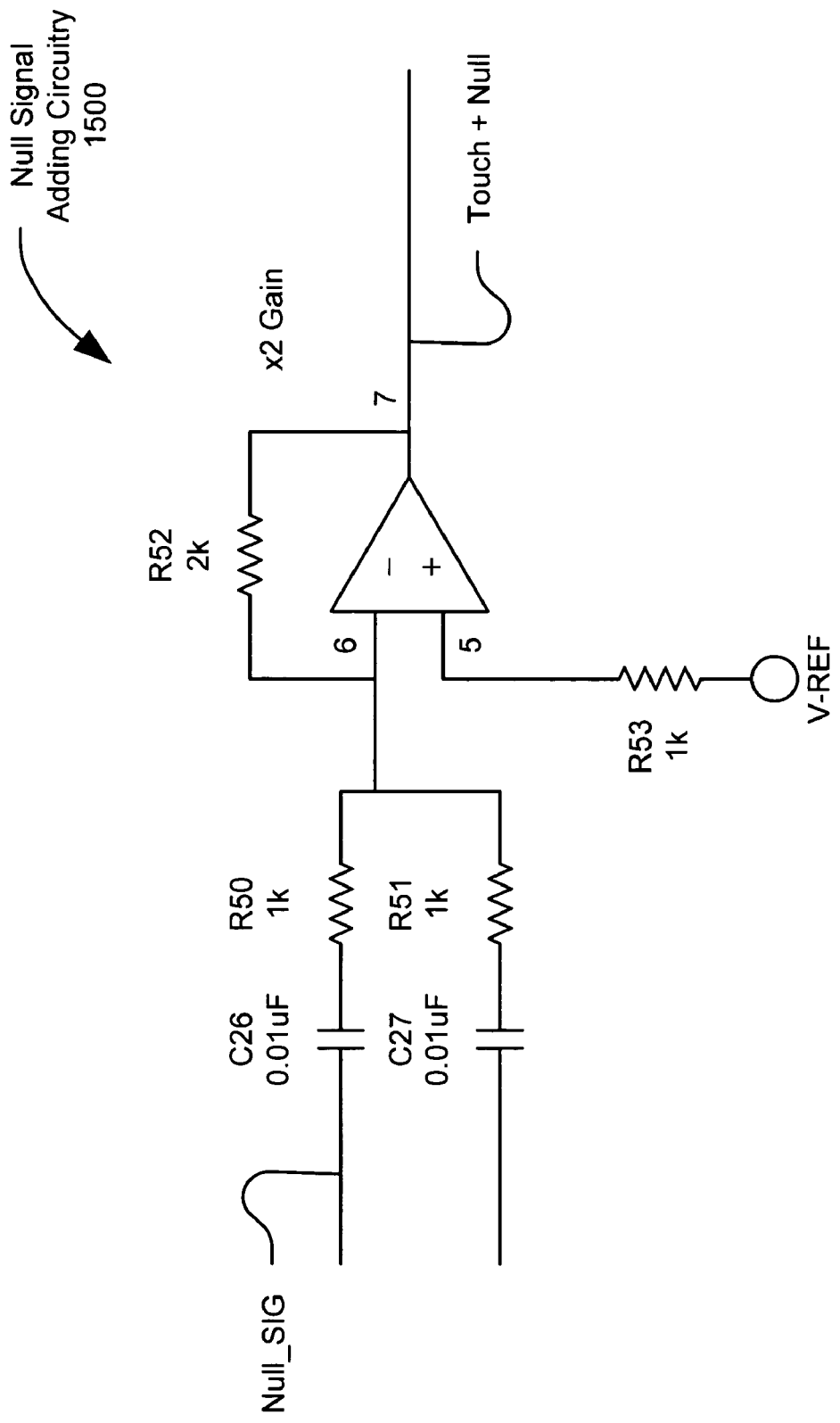
FIG. 15 is a circuitry diagram illustrating an embodiment of a null signal adding circuitry that is built in accordance with certain aspects of the invention.

FIG. 15 is a circuitry diagram illustrating an embodiment of a null signal adding circuitry that 1500 is built in accordance with certain aspects of the invention. The output signal from the FIG. 14, namely the null signal NULL_SIG, is provided to the to the null signal adding circuitry that 1500 of the FIG. 15. In addition, the other input to the null signal adding circuitry that 1500 is the output of the low pass double pole filter/gain stage circuitry 1300 of the FIG. 13.

The cooperative operation within the FIGS. 14 and 15 may be described as follows: the unbalanced reactive load on the touchscreen will take the form of a sine wave with a phase shift from the primary touchscreen drive signal. The amplitude and phase of the signal will be the integration of all the unbalanced capacitive reactance in the circuit. This includes the background grounding capacitive reactance of the screen and any touch reactance. Measuring this signal without a touch and removing it (nulling) leaves only the users touch current, left in the form of amplitude changes to the signal. Then, by generating a sine wave with a −180 deg phase and of similar amplitude and by adding this signal to the touchscreen signal, it can be almost completely zeroed. The remaining signal will contain some unbalanced capacitive reactance. Any changes to this signal will be due to one or more of noise induced into the touchscreen or circuit, temperature variations to the circuits or touchscreen, and humidity variations to the circuit or touchscreen.

Figure 16:
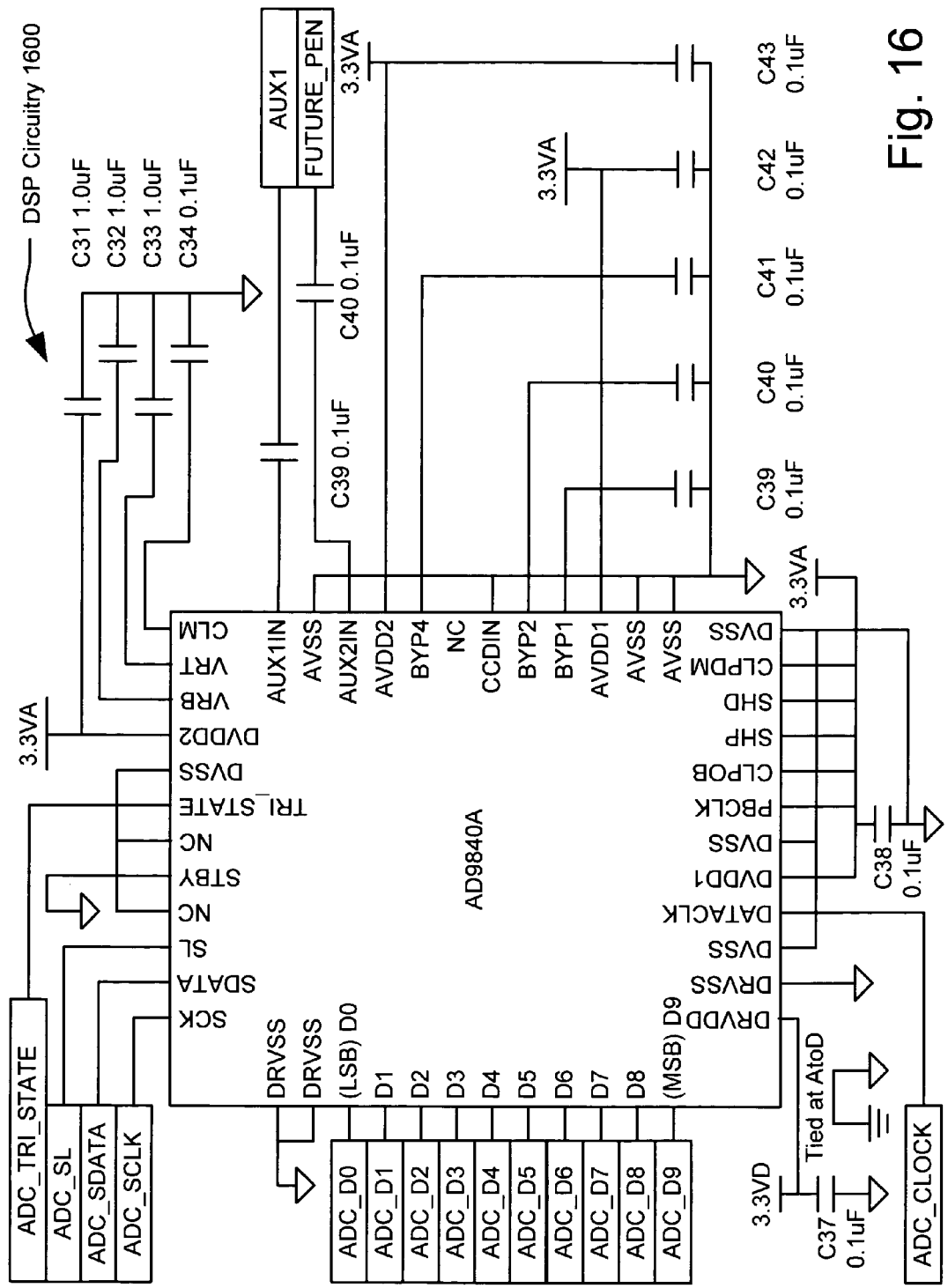
FIG. 16 is a circuitry diagram illustrating an embodiment of a digital signal processing (DSP) circuitry that is built in accordance with certain aspects of the invention.

FIG. 16 is a circuitry diagram illustrating an embodiment of a DSP circuitry 1600 that is built in accordance with certain aspects of the invention. The output of the null signal adding circuitry that 1500 of the FIG. 15, after having passed through another low pass double pole filter/gain stage circuitry (which may be a replication of the same low pass double pole filter/gain stage circuitry 1300 of the FIG. 13) is provided to the DSP circuitry 1600 as the signal AUX1 (on the analog to digital converter chip depicted herein). The DSP circuitry 1600 performs the functionality described above in the various embodiments to discern the particular location of a user's touch on the touchscreen. Those persons having skill in the art of electrical engineering will appreciate the signal processing shown within the particular embodiment of the FIG. 16.

Figure 17:
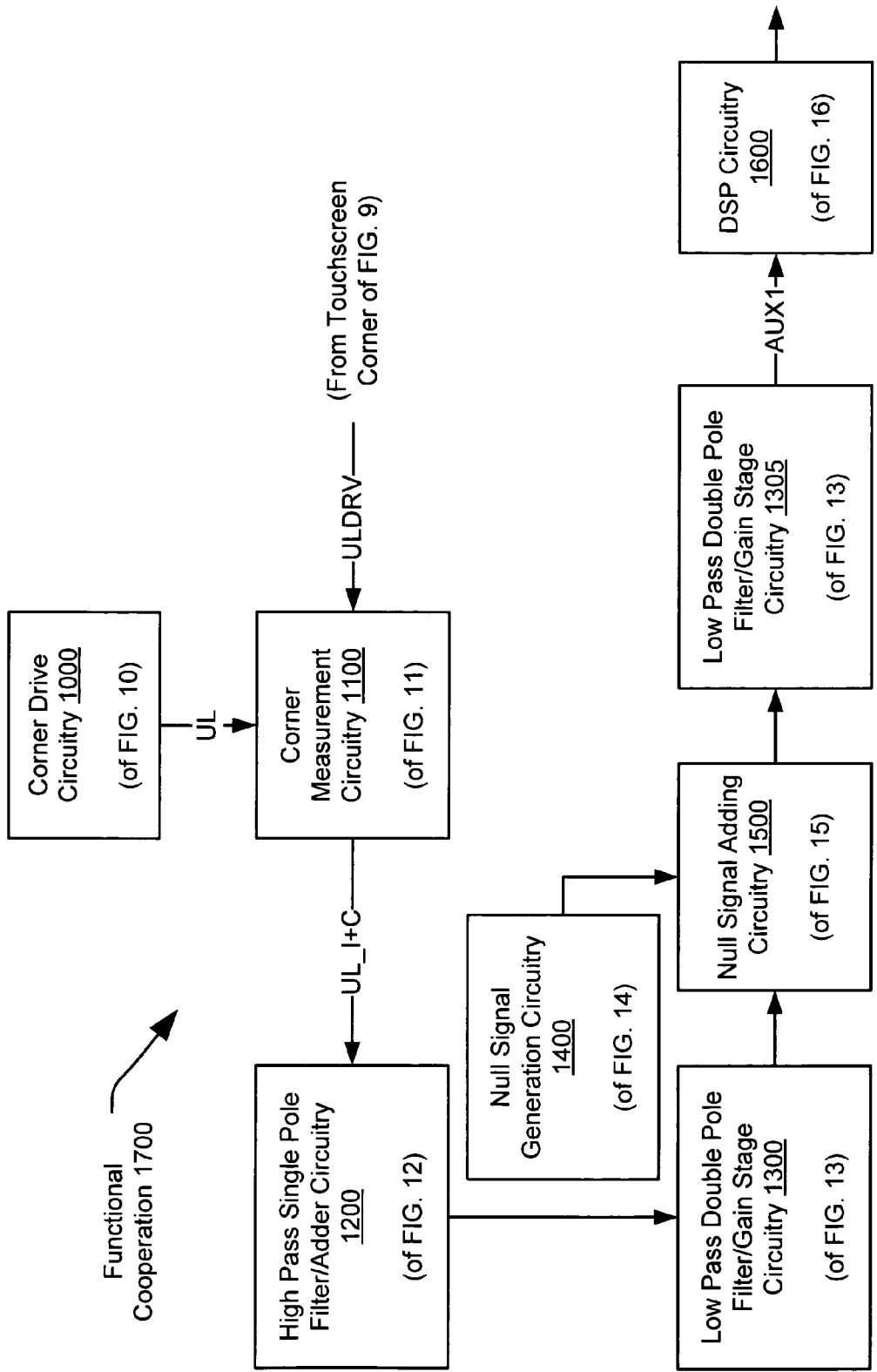
FIG. 17 is a functional block diagram illustrating an embodiment of functional cooperation performed by the various circuitries shown within the FIGS. 9, 10, 11, 12, 13, 14, 15, and 16.

FIG. 17 is a functional block diagram illustrating an embodiment of functional cooperation performed by the various circuitries shown within the FIGS. 9, 10, 11, 12, 13, 14, 15, and 16. The signal ULDRV is provided from the touchscreen corner of the FIG. 9. This ULDRV signal is provided to the corner measurement circuitry 1100 of the FIG. 11. In addition, the corner drive circuitry 1000 of the FIG. 10 provides the signal UL to the corner measurement circuitry 1100 of the FIG. 11 from which the signal UL_I+C is output and passed to the high pass single pole filter/adder circuitry 1200 of the FIG. 12. It is noted that signals LLDRV, URDRV, and LRDRV are provided from the other corner measurement circuitries associated with the three corners as well, and they generate the signals LL_I+C, UR_I+C, and LR_I+C that are all provided to the high pass single pole filter/adder circuitry 1200 along with the signal UL_I+C. The output of the high pass single pole filter/adder circuitry 1200 of the FIG. 12 is provided to the low pass double pole filter/gain stage circuitry 1300. The output of the low pass double pole filter/gain stage circuitry 1300 is provided to the null signal adding circuitry that 1500, where the output from the null signal generation circuitry 1400 is added in. The output of the null signal adding circuitry that 1500 is provided to another low pass double pole filter/gain stage circuitry 1305; this low pass double pole filter/gain stage circuitry 1305 may be a replica of the low pass double pole filter/gain stage circuitry 1300 of the FIG. 13. The output of the low pass double pole filter/gain stage circuitry 1305 is provided to the DSP circuitry 1600 of the FIG. 16.

It is also noted that the various circuitries presented herein may also be compacted or integrated into fewer (or more) circuitry components without departing from the scope and spirit of the invention. For example, the functionality presented herein may be implemented using more or less blocks and/or circuitry to perform similar or analogous functionality without departing from the scope and spirit of the invention.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A touchscreen system, comprising:
a touchscreen having a frontside and a backside;
a resistive pattern that is attached to the backside of the touchscreen;
a plurality of drive signal circuits that are communicatively coupled to the resistive pattern at communicative coupling points, each drive signal circuit within the plurality of drive signal circuits is also operable to measure current flow at the communicative coupling points of each drive signal circuit within the plurality of drive signal circuits to the touchscreen;
wherein each drive signal circuit within the plurality of drive signal circuits operates cooperatively to energize the resistive pattern thereby generating an amplitude ramped field that communicatively couples through the touchscreen to the frontside of the touchscreen and extends across the frontside of the touchscreen in a direction, the direction being selectable by applying full scale AC signals to some of the communicative coupling points and virtual ground signals to other communicative coupling points, the amplitude ramped field is operable to be selectively ramped in a plurality of directions across the touchscreen;

a plurality of subtraction circuits, each subtraction circuit being communicatively coupled to one of the plurality drive signal circuits and each subtraction circuit being operable to remove any substantially purely resistive current portion that is injected into one of the corners by one of the drive signal circuits, each of the subtraction circuits also being operable to perform high pass filtering and adding to remove any resistance portion of the current flow at the corners of the touchscreen thereby leaving a resulting current flow having an unbalanced capacitive reactance current portion;

a nulling and adding circuitry that is operable to reduce a non-user touch portion of the unbalanced capacitive reactance current portion and to increase an overall resolution of the unbalanced capacitive reactance current portion that is substantially attributable to a user's touch on the touchscreen;

an analog to digital converter that converts the unbalanced capacitive reactance current portion that is substantially attributable to a user's touch on the touchscreen to a digital signal;

wherein the current flow at the points of communicative coupling includes an unbalanced capacitive reactance current portion wherein a change of the unbalanced capacitive reactance current portion includes a portion that is substantially attributable to a user's interaction or touch on the touchscreen; and a digital signal processor that is operable to process a digital version of the change of the unbalanced capacitive reactance current portion to discriminate a location of the user's interaction or touch on the touchscreen.

2. The touchscreen system of claim 1, further comprising:
a digital wave generator chip that is operable to generate a wave function comprising a predetermined amplitude that is delivered to at least one of the drive signal circuits within the plurality of drive signal circuits.

3. The touchscreen system of claim 1, wherein:
the touchscreen comprises a dielectric material; and
the resistive pattern that is attached to the backside of the dielectric material.

4. The touchscreen system of claim 1, wherein:
the plurality of directions across the touchscreen includes at least four directions comprising a horizontal direction from left to right, a horizontal direction from right to left, a vertical direction from top to bottom, and a vertical direction from bottom to top.

5. The touchscreen system of claim 1, wherein:
each drive signal circuit within the plurality of drive signal circuits simultaneously energize all of the communicative coupling points with a full scale AC signal when the digital signal processor fails to detect a user's touch for a predetermined period of time; and
the touchscreen system operates in an energy conservation mode.

6. The touchscreen system of claim 1, wherein:
each drive signal circuit within the plurality of drive signal circuits begins to energize the resistive pattern thereby generating the amplitude ramped field that extends across the surface of the touchscreen when the digital signal processor detects a user's touch on the touchscreen.

7. The touchscreen system of claim 1, wherein:
the digital signal processor compensates for at least one of noise introduced into the touchscreen, a temperature variation of the touchscreen system, and a humidity variation of the touchscreen system when processing the digital version of the change of the unbalanced capacitive reactance current portion to discriminate the location of the user's touch on the touchscreen.

8. The touchscreen system of claim 1, wherein:
the amplitude ramped field across the touchscreen effectuates an unbalanced capacitive load across the touchscreen.

9. The touchscreen system of claim 1, wherein:
the touchscreen includes four corners;
the plurality of drive signal circuits includes four drive signal circuits such that each of the four drive signal circuits is coupled to the resistive pattern at one of the four corners of the touchscreen; and
each of the four drive signal circuits is operable to measure current flow at its respective corner of the touchscreen.

10. A touchscreen system, comprising:
a touchscreen having a frontside and a backside;
a resistive pattern that is attached to the backside of the touchscreen;
a plurality of drive signal circuits that are communicatively coupled to the resistive pattern at communicative coupling points, each drive signal circuit within the plurality of drive signal circuits is also operable to measure current flow at the communicative coupling points of each drive signal circuit within the plurality of drive signal circuits to the touchscreen;
wherein each drive signal circuit within the plurality of drive signal circuits operates cooperatively to energize the resistive pattern thereby generating an amplitude ramped field that communicatively couples through the touchscreen to the frontside of the touchscreen and extends across the frontside of the touchscreen in a direction, the direction being selectable by applying full scale AC signals to some of the communicative coupling points and virtual ground signals to other communicative coupling points, the amplitude ramped field is operable to be selectively ramped in a plurality of directions across the touchscreen;
wherein the current flow at the points of communicative coupling includes an unbalanced capacitive reactance current portion wherein a change of the unbalanced capacitive reactance current portion includes a portion that is substantially attributable to a user's interaction or touch on the touchscreen;
a digital signal processor that is operable to process a digital version of the change of the unbalanced capacitive reactance current portion to discriminate a location of the user's interaction or touch on the touchscreen;
wherein the touchscreen includes four corners;
wherein the plurality of drive signal circuits includes four drive signal circuits such that each of the four drive signal circuits is coupled to the resistive pattern at one of the four corners of the touchscreen;
wherein each of the four drive signal circuits is operable to measure current flow at its respective corner of the touchscreen;
four subtraction circuits, each subtraction circuit being communicatively coupled to one of the four drive signal circuits and each subtraction circuit being operable to remove any substantially purely resistive current portion that is injected into one of the corners by one of the drive signal circuits, each of the four subtraction circuits also being operable to perform high pass filtering and adding to remove any resistance portion of the current flow at the corners of the touchscreen thereby leaving a resulting current flow having an unbalanced capacitive reactance current portion;

a nulling and adding circuitry that is operable to reduce a non-user touch portion of the unbalanced capacitive reactance current portion and to increase an overall resolution of the unbalanced capacitive reactance current portion that is substantially attributable to a user's touch on the touchscreen; and an analog to digital converter that converts the unbalanced capacitive reactance current portion that is substantially attributable to a user's touch on the touchscreen to a digital signal.

11. The touchscreen system of claim 10, wherein:

the four drive signal circuits simultaneously energize all four corners of the touchscreen with a full scale AC signal when the digital signal processor fails to detect a user's touch for a predetermined period of time;

the digital signal processor detects and compensates for at least one of a temperature variation of the touchscreen system and humidity variation of the touchscreen system;

the touchscreen system operates in an energy conservation mode; and the digital signal processor exits the energy conservation mode after detecting the user's touch on the touchscreen.

12. The touchscreen system of claim 11, wherein:

the four drive signal circuits energize the resistive pattern thereby generating the amplitude ramped field that extends across the surface of the touchscreen when the digital signal processor detects a user's touch on the touchscreen.

* * * * *